(12) United States Patent
Komatsubara et al.

(10) Patent No.: US 12,366,729 B2
(45) Date of Patent: Jul. 22, 2025

(54) OPTICAL SYSTEM, OPTICAL APPARATUS, AND METHOD FOR MANUFACTURING OPTICAL SYSTEM

(71) Applicant: Nikon Corporation, Tokyo (JP)

(72) Inventors: Yoko Komatsubara, Yokohama (JP); Toshinori Take, Yokohama (JP); Masashi Yamashita, Tokyo (JP); Satoshi Miwa, Yokohama (JP)

(73) Assignee: Nikon Corporation, Tokyo (JP)

( * ) Notice: Subject to any disclaimer, the term of this patent is extended or adjusted under 35 U.S.C. 154(b) by 808 days.

(21) Appl. No.: 17/594,390

(22) PCT Filed: Mar. 18, 2020

(86) PCT No.: PCT/JP2020/011986
§ 371 (c)(1),
(2) Date: Oct. 14, 2021

(87) PCT Pub. No.: WO2020/217791
PCT Pub. Date: Oct. 29, 2020

(65) Prior Publication Data
US 2022/0244502 A1 Aug. 4, 2022

(30) Foreign Application Priority Data
Apr. 26, 2019 (JP) .................. 2019-085098

(51) Int. Cl.
*G02B 15/14* (2006.01)
*G02B 13/00* (2006.01)
(Continued)

(52) U.S. Cl.
CPC ......... *G02B 13/0045* (2013.01); *G02B 13/02* (2013.01); *G02B 15/22* (2013.01)

(58) Field of Classification Search
CPC . G02B 9/00; G02B 9/12; G02B 13/00; G02B 13/001; G02B 13/0015;
(Continued)

(56) References Cited

U.S. PATENT DOCUMENTS 5,325,234 A * 6/1994 Yoneyama ............. G02B 13/02
359/748
5,572,276 A * 11/1996 Hirakawa ...... G02B 15/144113
359/686
(Continued)

FOREIGN PATENT DOCUMENTS

JP 2011-085788 A 4/2011
JP 2017-026712 A 2/2017
(Continued)

OTHER PUBLICATIONS

Office Action issued Apr. 15, 2022, in Chinese Patent Application No. 202080030849.7.
(Continued)

*Primary Examiner* — Thong Q Nguyen
(74) *Attorney, Agent, or Firm* — Potomac Law Group, PLLC

(57) ABSTRACT

An optical system and an optical apparatus that have favorable imaging performance and a method for manufacturing the optical system are provided. An optical system OL includes, sequentially from an object side, a front group G1 having positive refractive power and a focusing group G2 that performs focusing by moving in an optical axis direction, the front group G1 includes, sequentially from the object side, a first lens L11, a second lens L12, and a third lens L13, and the optical system OL satisfies a condition expressed by an expression below, $$0.10 < D23/f1 < 0.75$$

in the expression, (Continued)

f1: focal length of the front group G1, and

D23: distance on an optical axis between the second lens L12 and the third lens L13.

23 Claims, 23 Drawing Sheets

(51) Int. Cl.
*G02B 13/02* (2006.01)
*G02B 15/22* (2006.01)

(58) Field of Classification Search
CPC ............. G02B 13/002; G02B 13/0045; G02B 13/006; G02B 15/00; G02B 15/14; G02B 15/143; G02B 15/1431; G02B 15/143103; G02B 15/22; G02B 15/24; G02B 27/0025; G02B 15/20
USPC .......................... 359/676, 683–685, 689, 693
See application file for complete search history.

(56) References Cited

U.S. PATENT DOCUMENTS

| | | | |
|---|---|---|---|
| 5,757,555 A * | 5/1998 | Sato | G02B 13/02 |
| | | | 359/557 |
| 9,952,446 B2 * | 4/2018 | Abe | G02B 15/144113 |
| 2011/0090576 A1 | 4/2011 | Sugita | |
| 2014/0300804 A1 | 10/2014 | Ryu | |
| 2020/0026047 A1 | 1/2020 | Hosoi et al. | |
| 2020/0174233 A1 * | 6/2020 | Iwamoto | G02B 9/10 |

FOREIGN PATENT DOCUMENTS

| | | |
|---|---|---|
| JP | 2017-223754 A | 12/2017 |
| WO | WO 2018/088038 A1 | 5/2018 |

OTHER PUBLICATIONS

International Preliminary Report on Patentability from International Patent Application No. PCT/JP2020/011986, Nov. 4, 2021.
Office Action issued Jun. 28, 2022, in Japanese Patent Application No. 2021-515874.
Office Action issued Oct. 13, 2022, in Chinese Patent Application No. 202080030849.7.
International Search Report from International Patent Application No. PCT/JP2020/011986, Jun. 16, 2020.

* cited by examiner

[Fig.1]
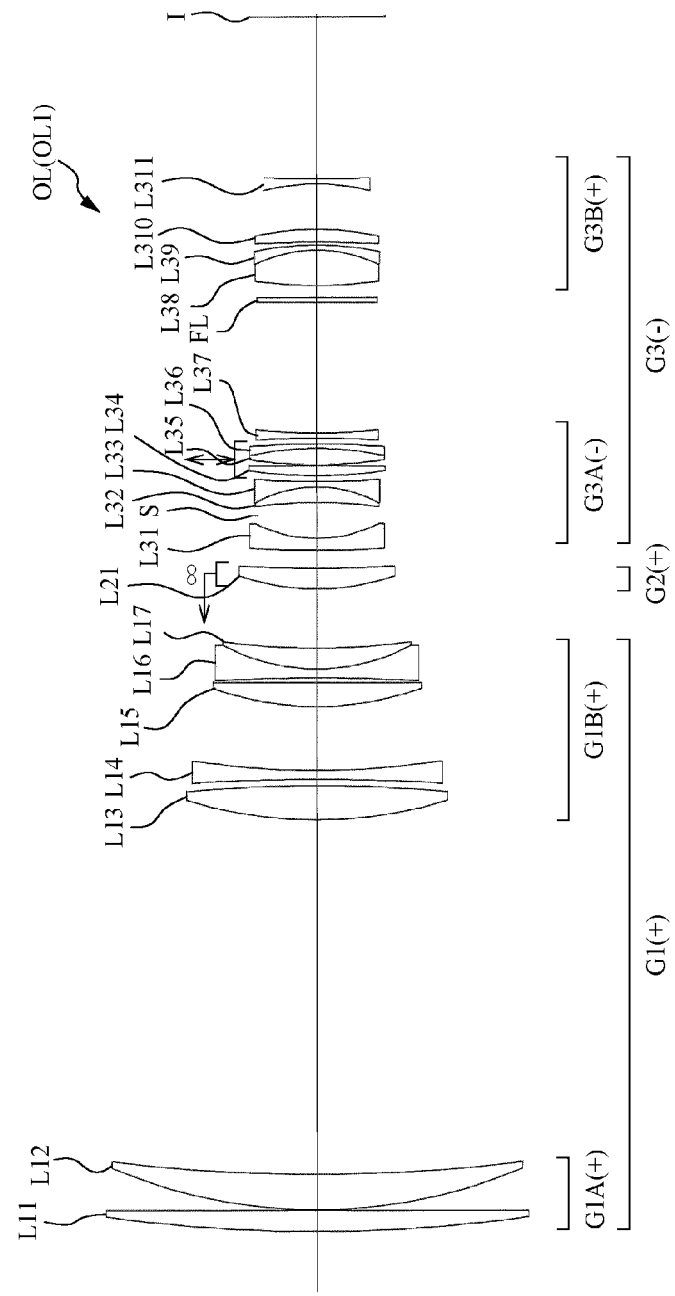

[Fig.2(a)]
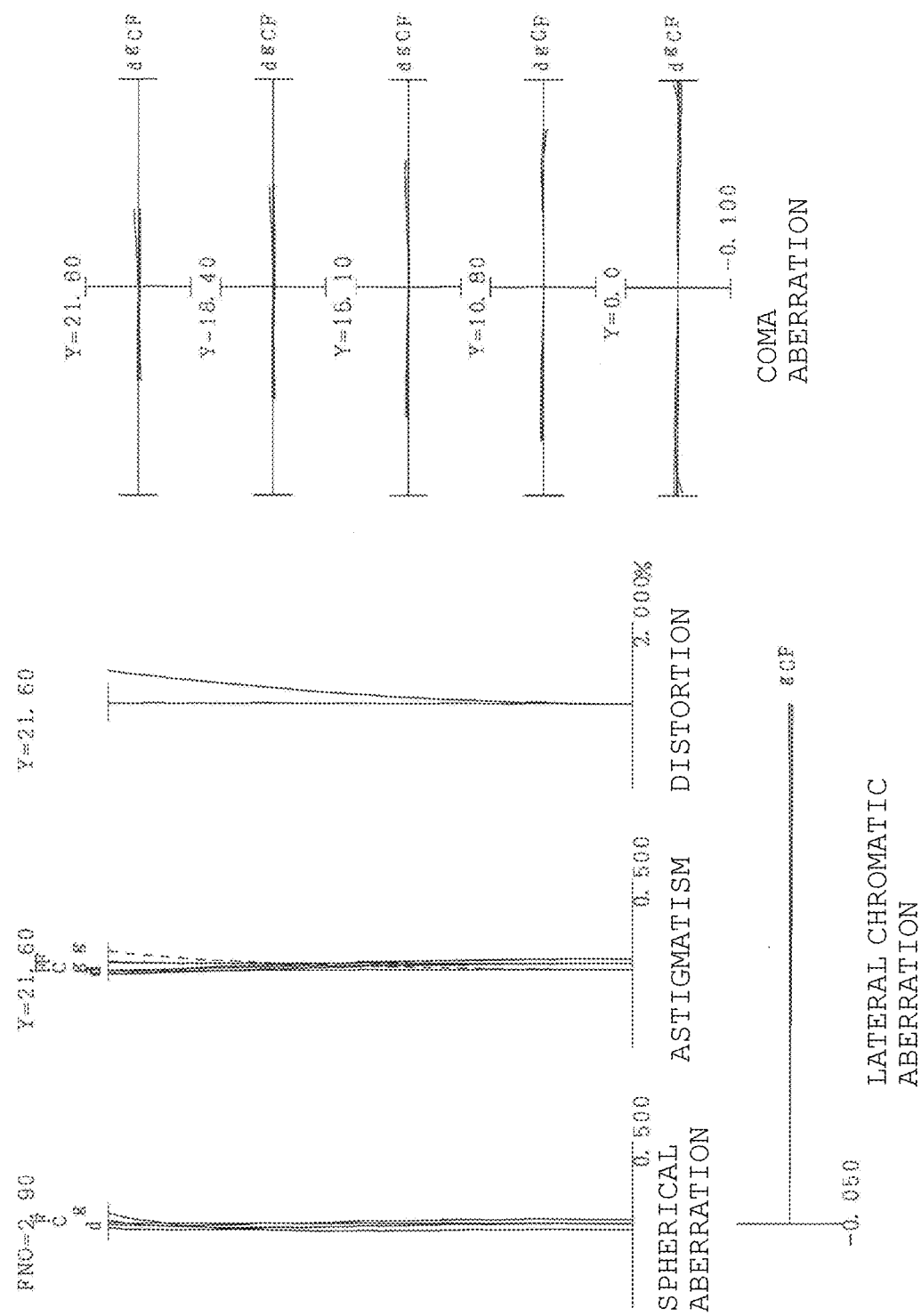

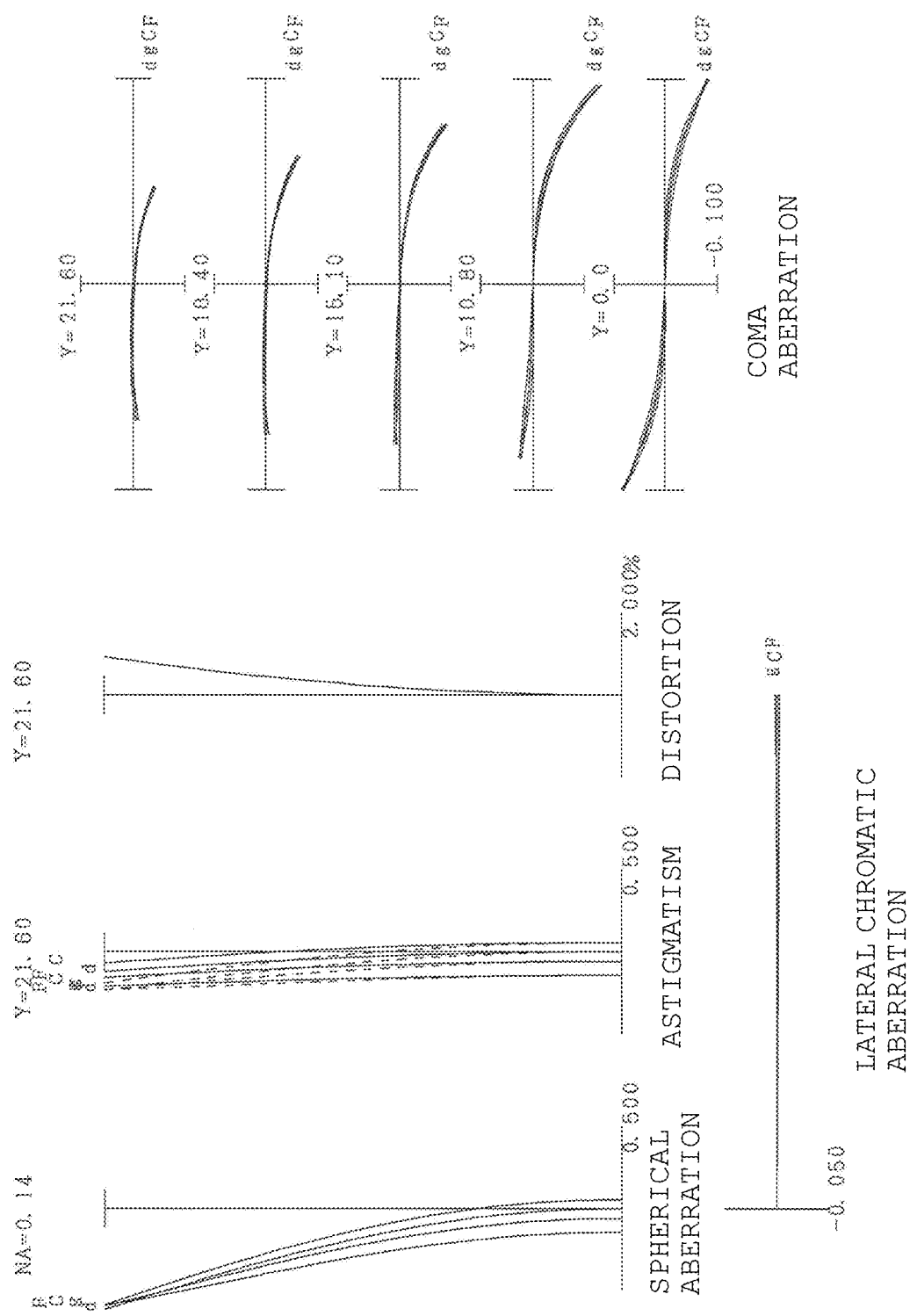
[Fig.2(b)]

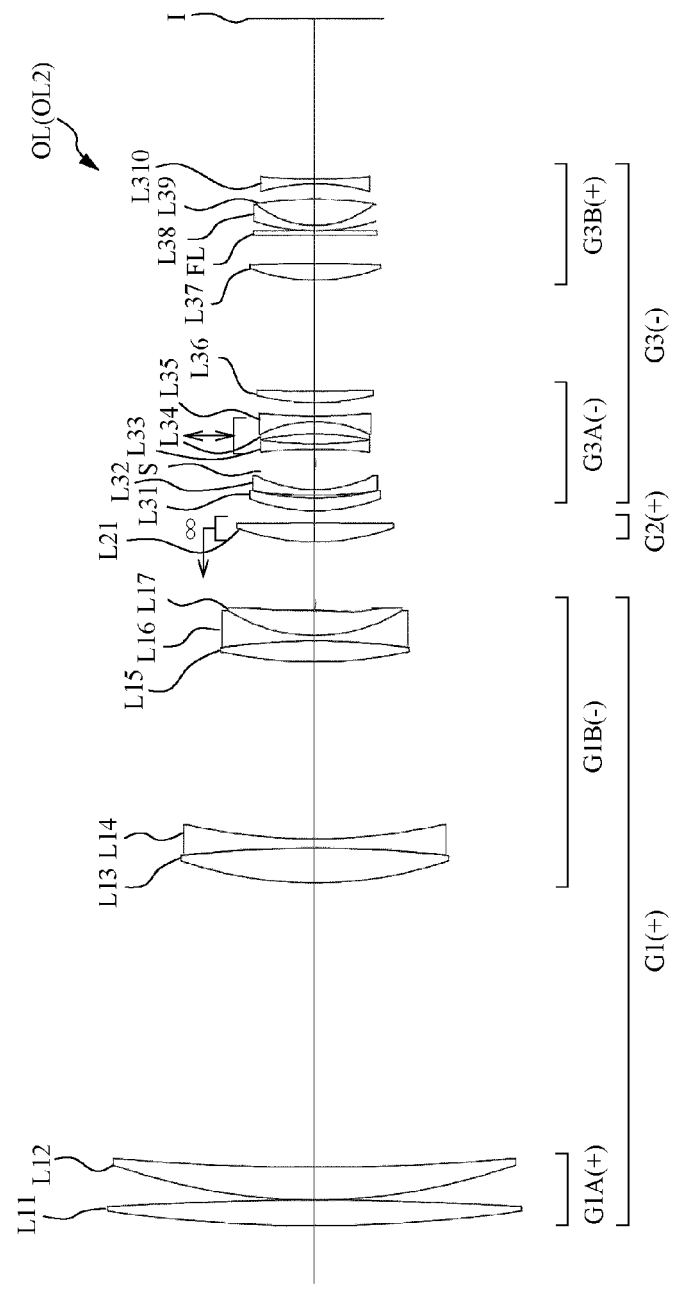
[Fig. 3]

[Fig.4(a)]
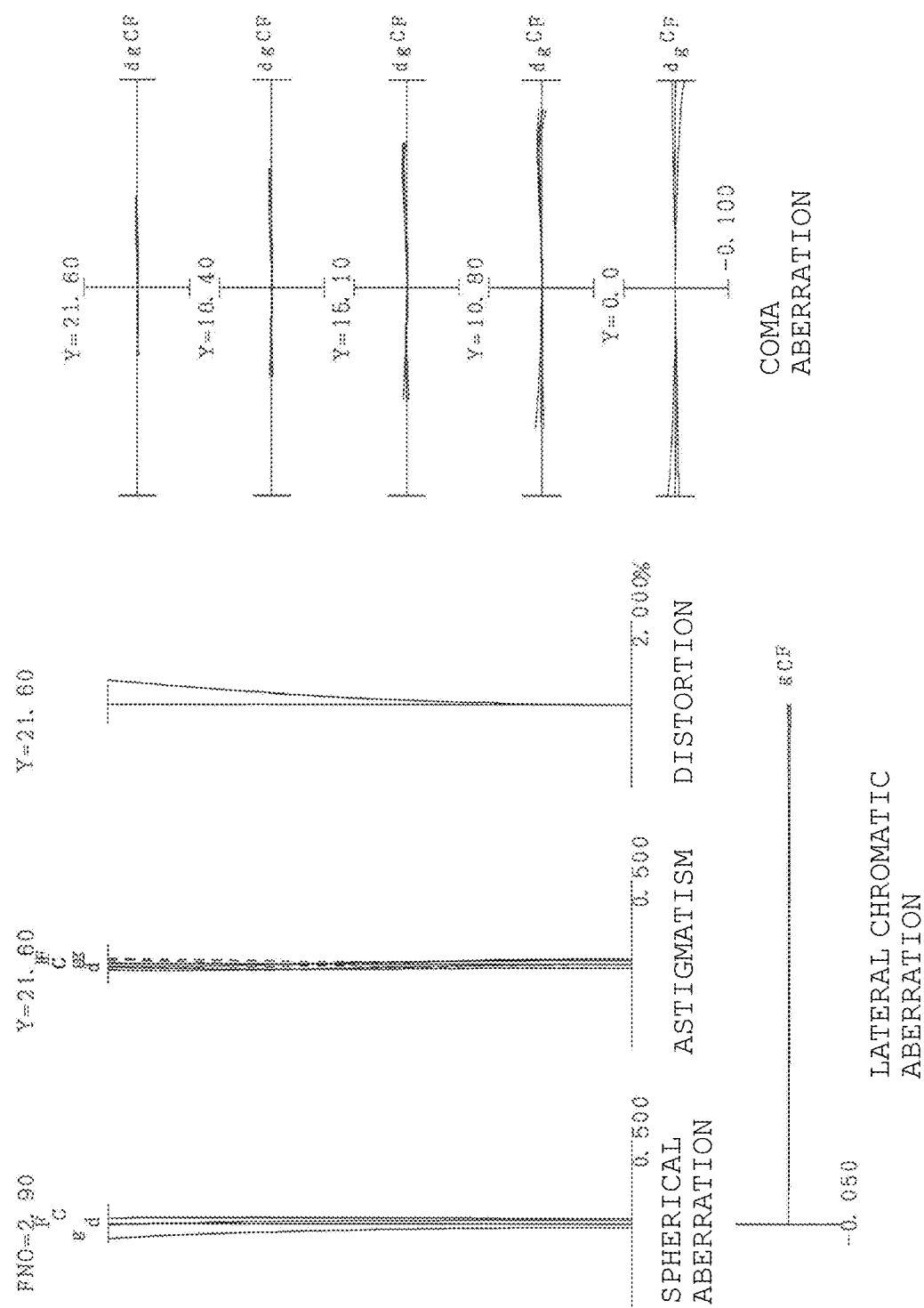

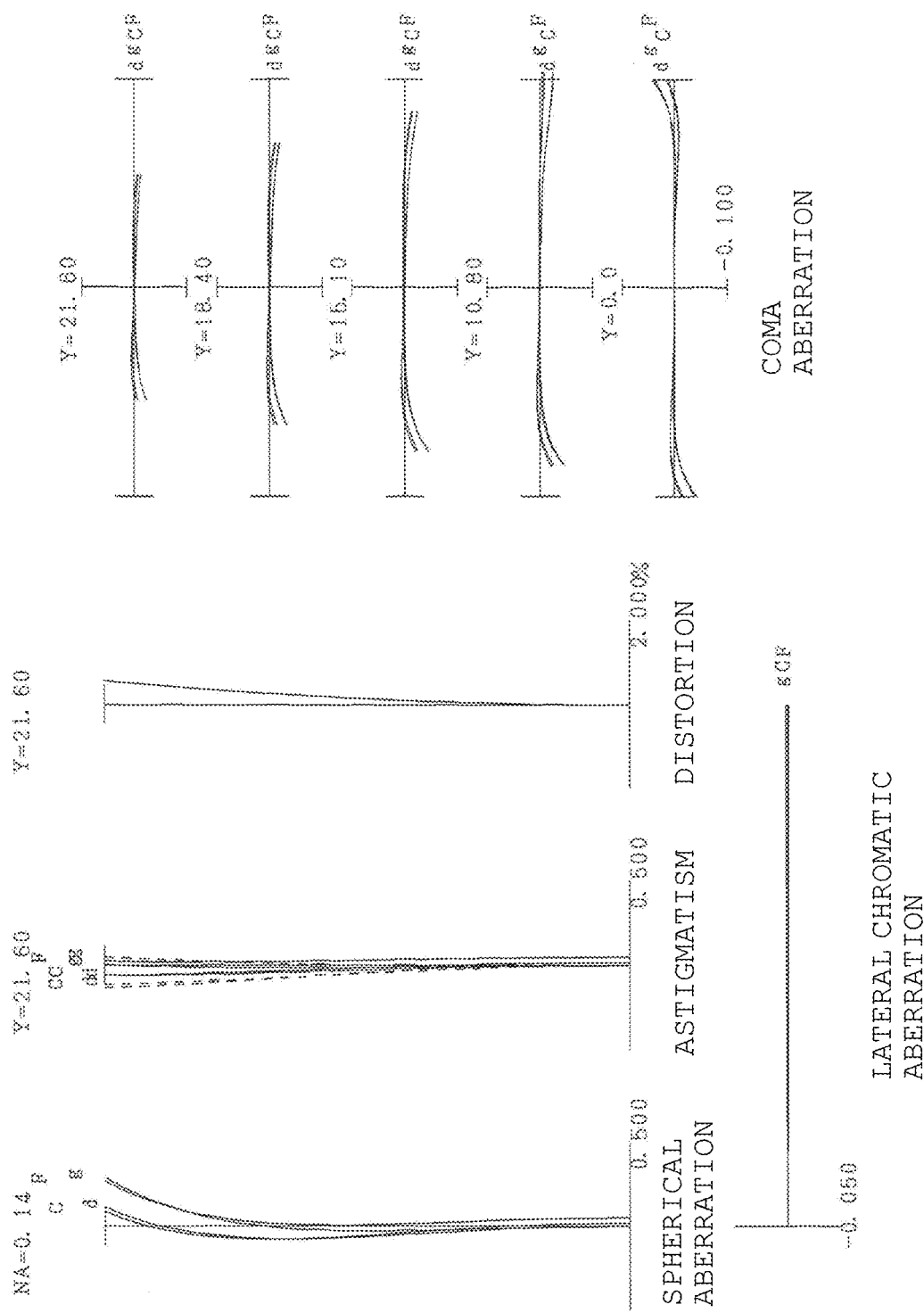
[Fig.4(b)]

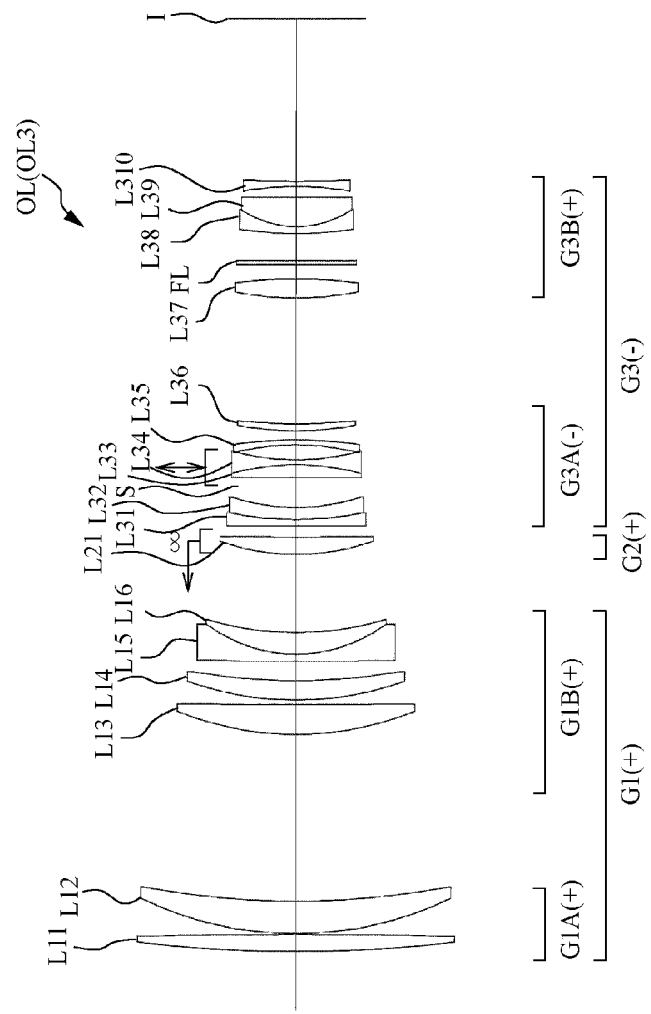
[Fig. 5]

[Fig.6(a)]
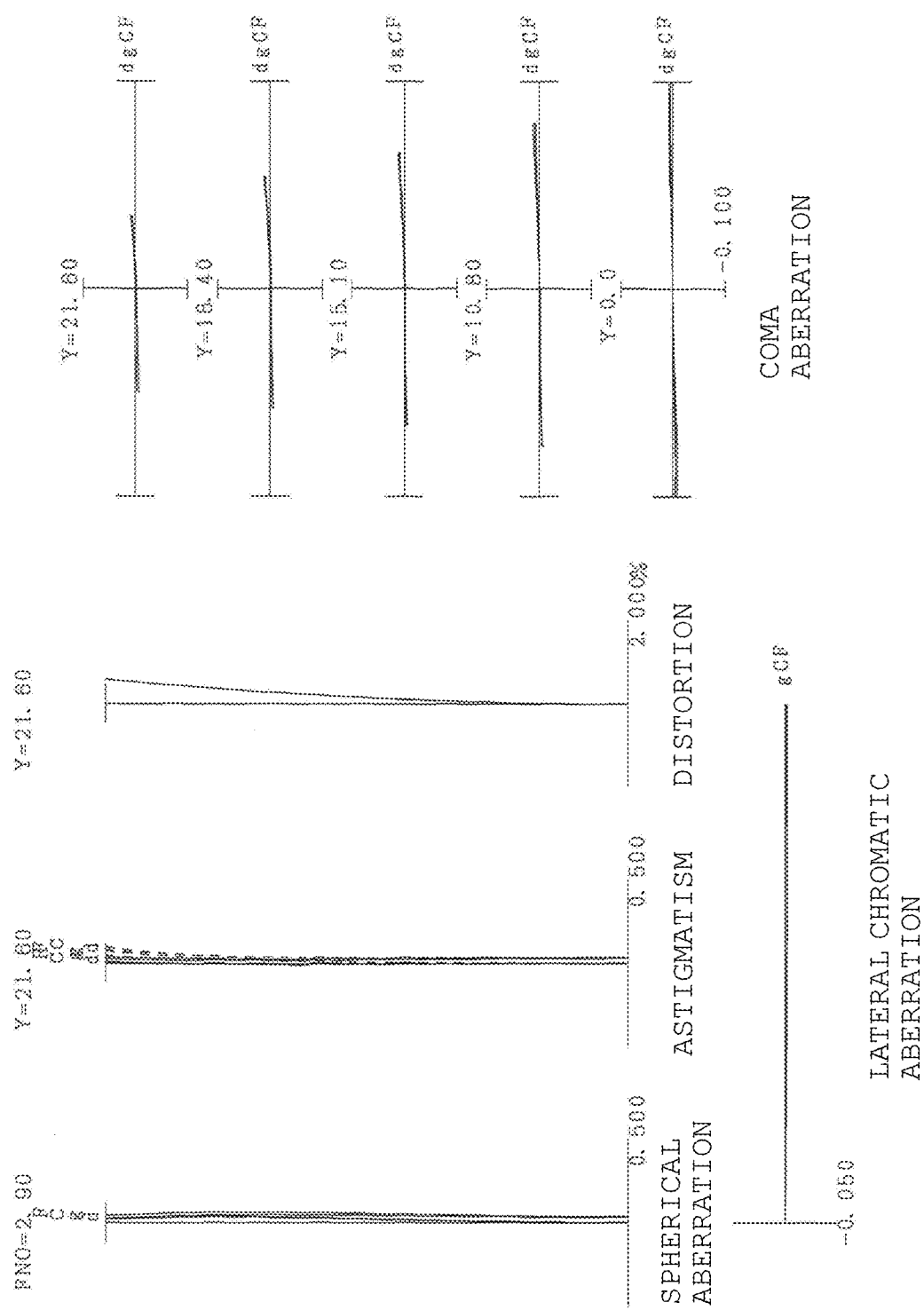

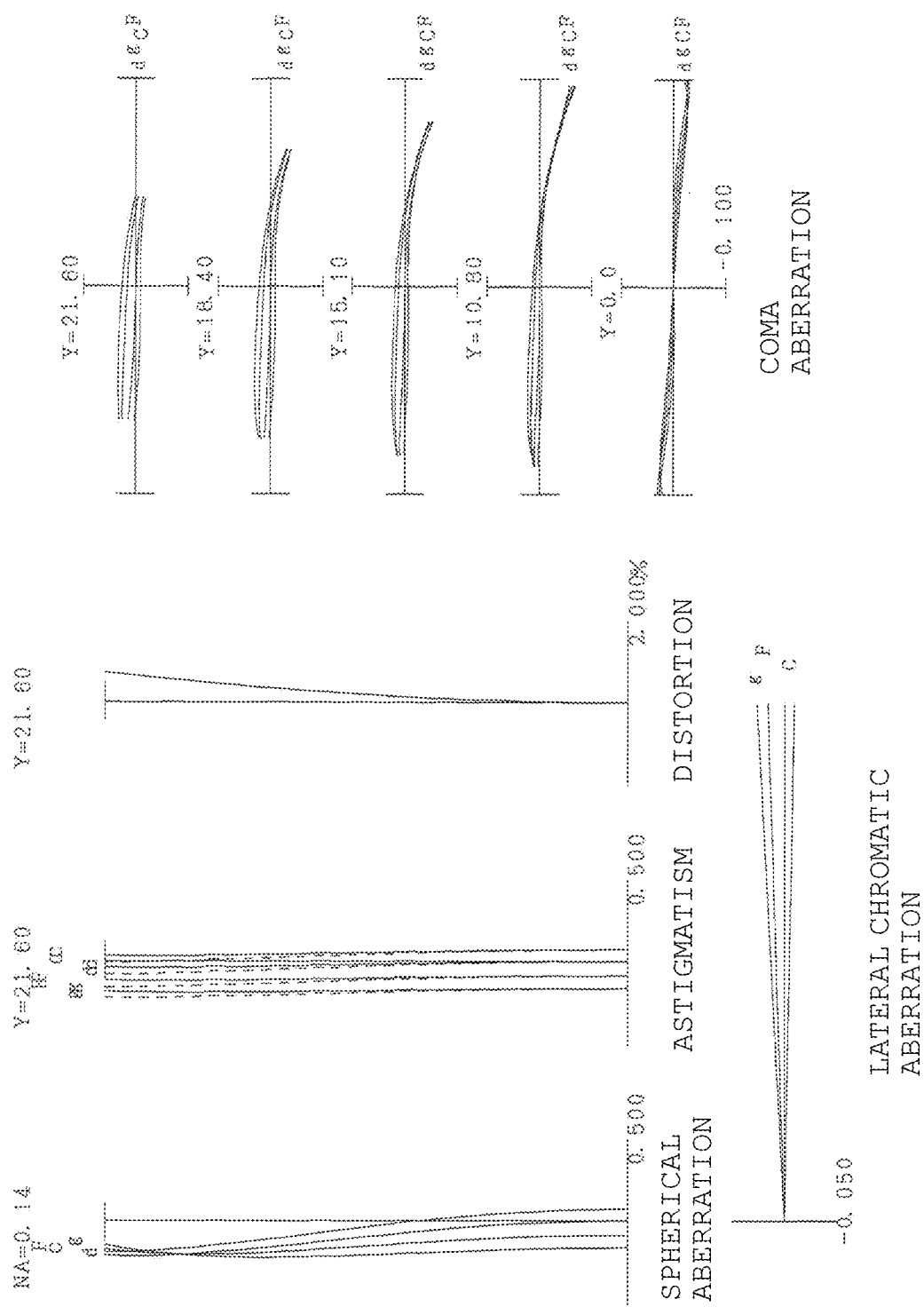
[Fig.6(b)]

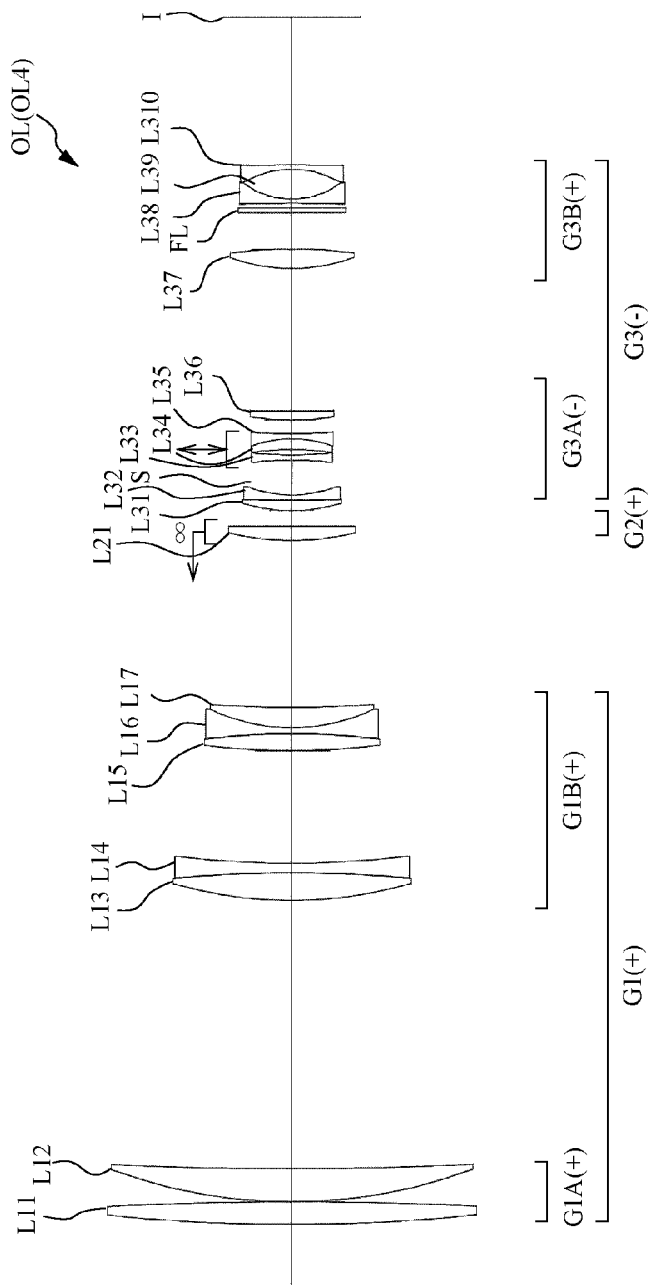
[Fig. 7]

[Fig. 8(a)]
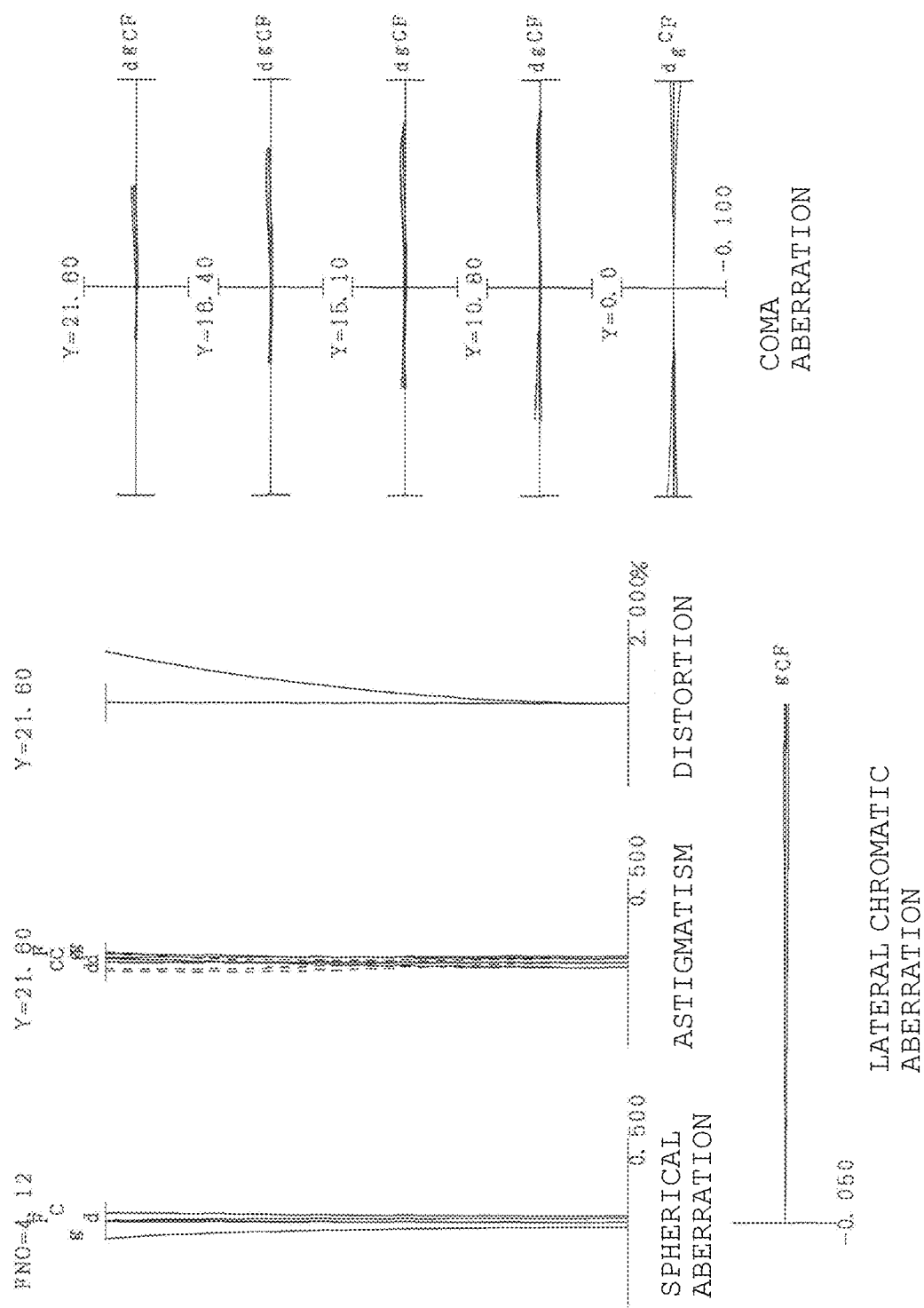

[Fig.8(b)]
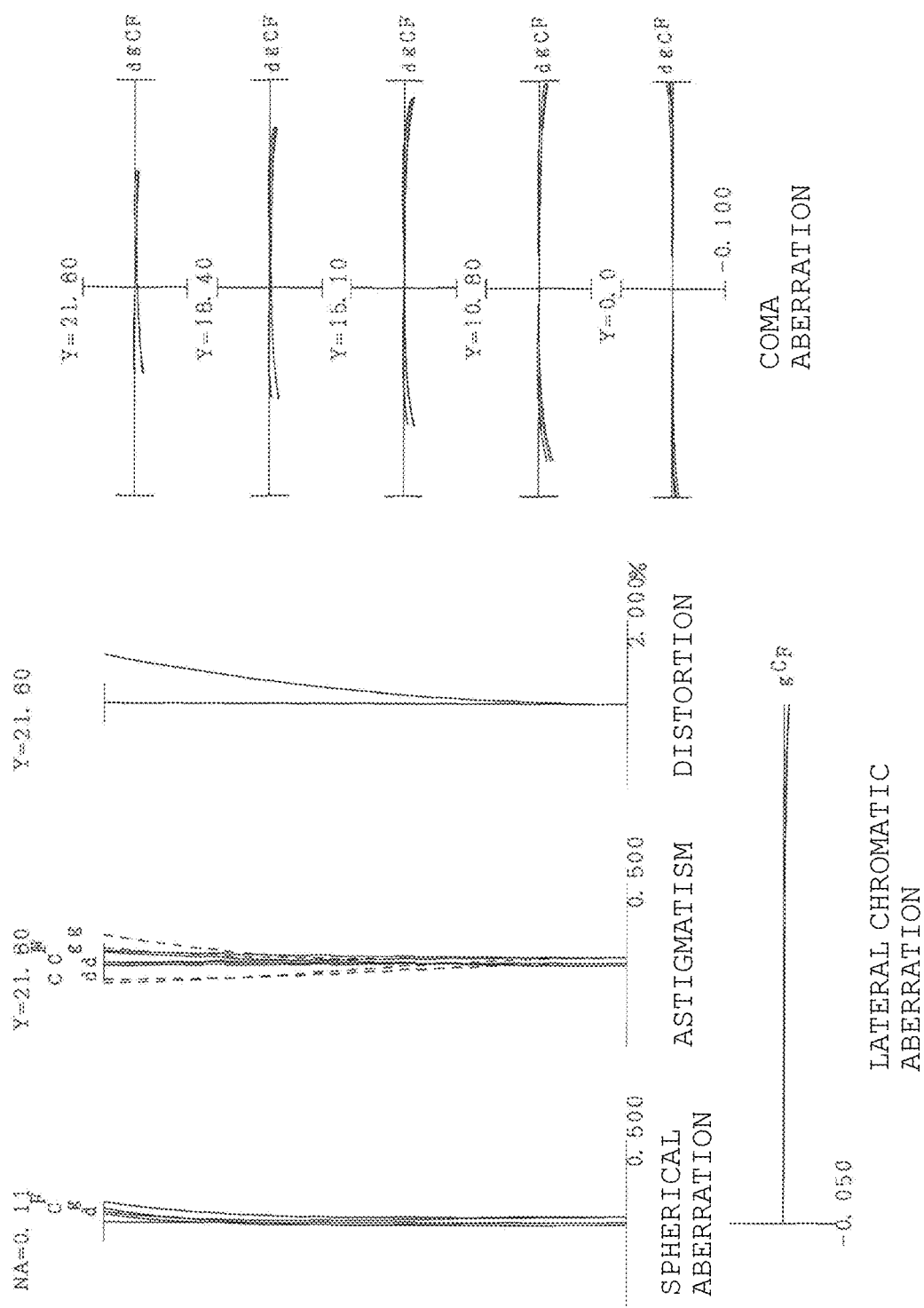

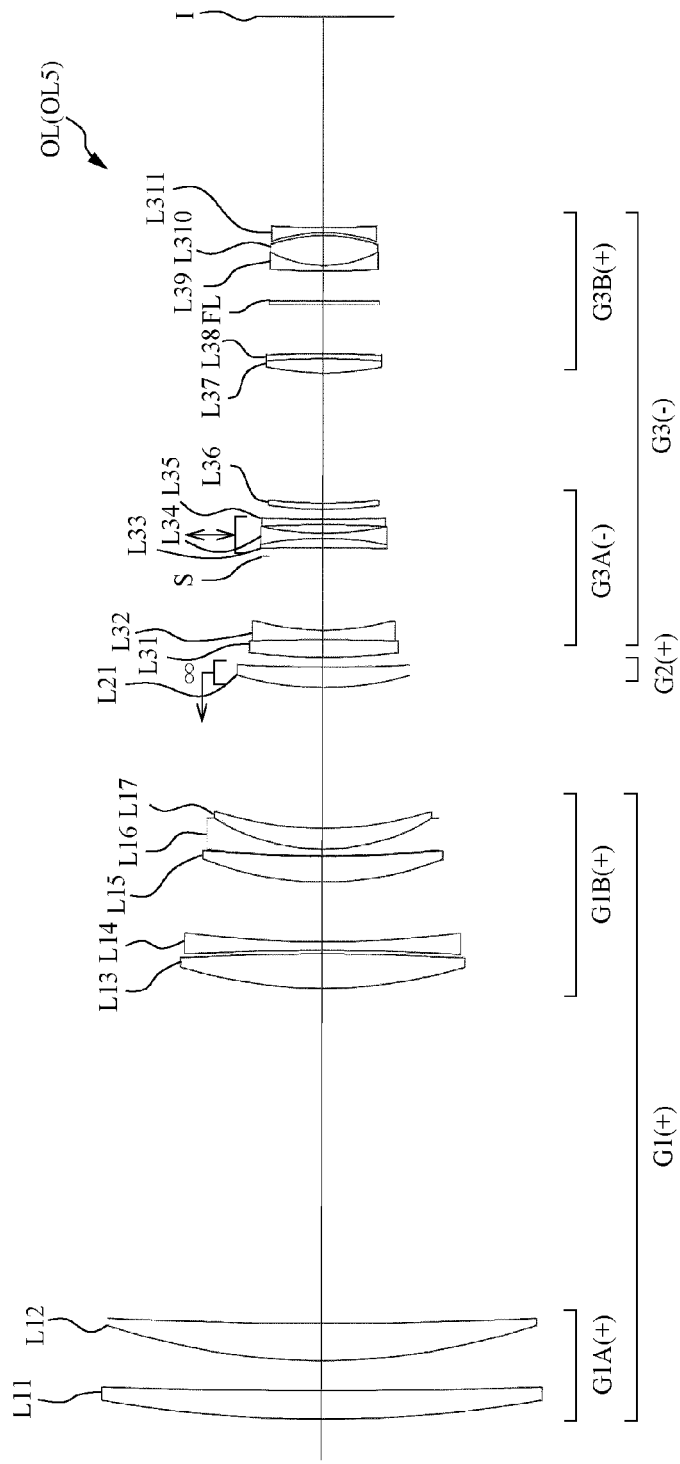
[Fig. 9]

[Fig.10(a)]
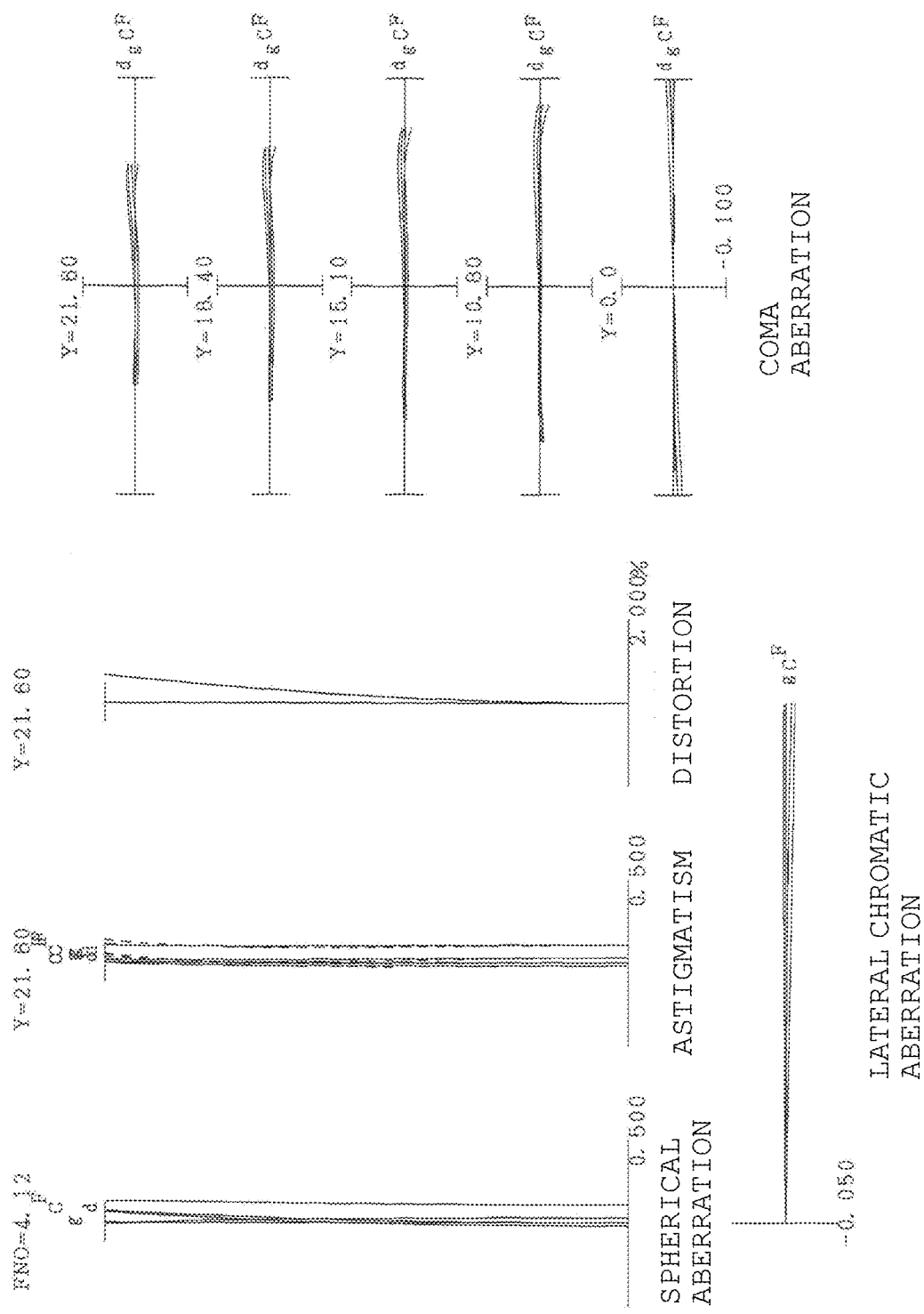

[Fig.10(b)]
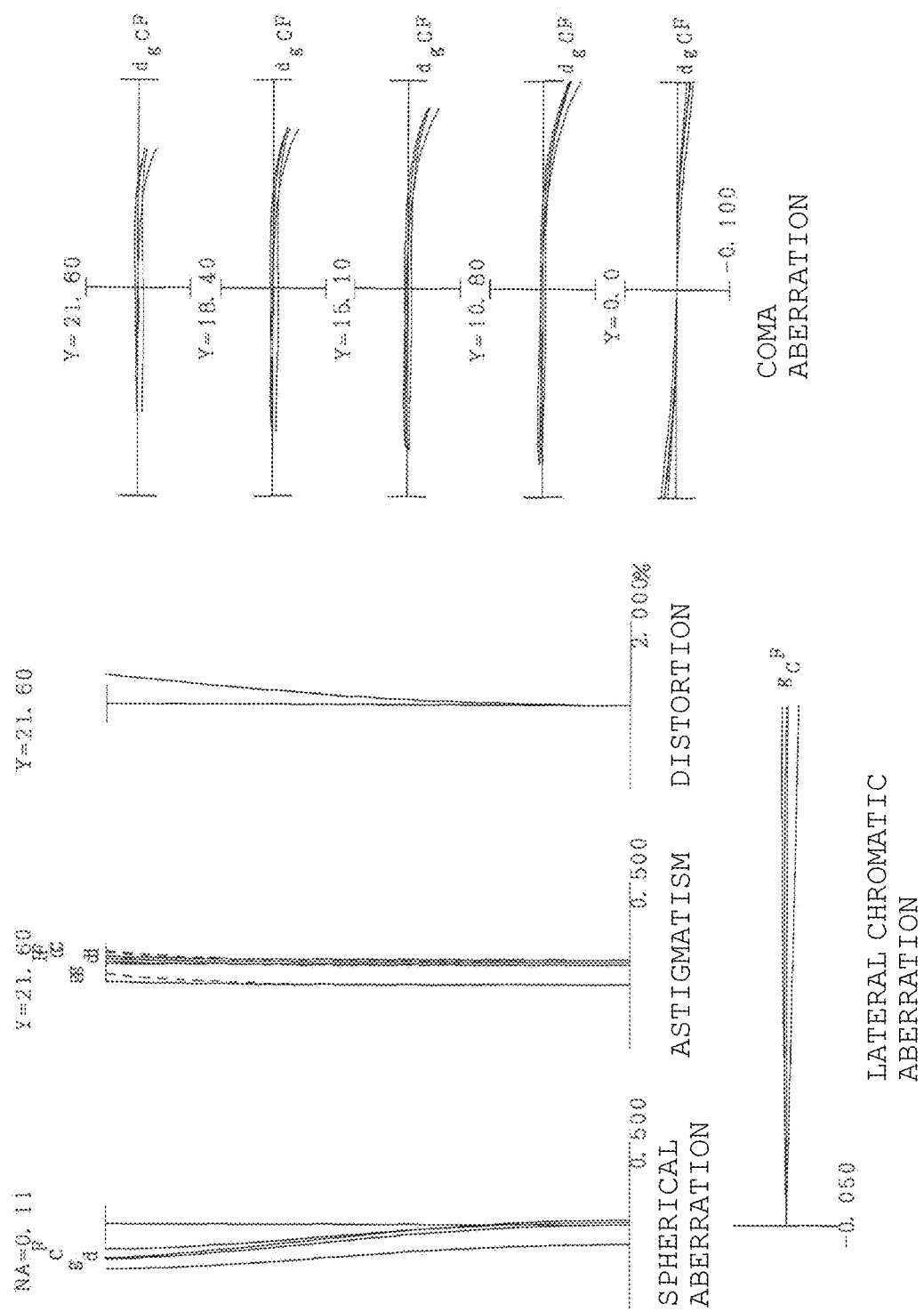

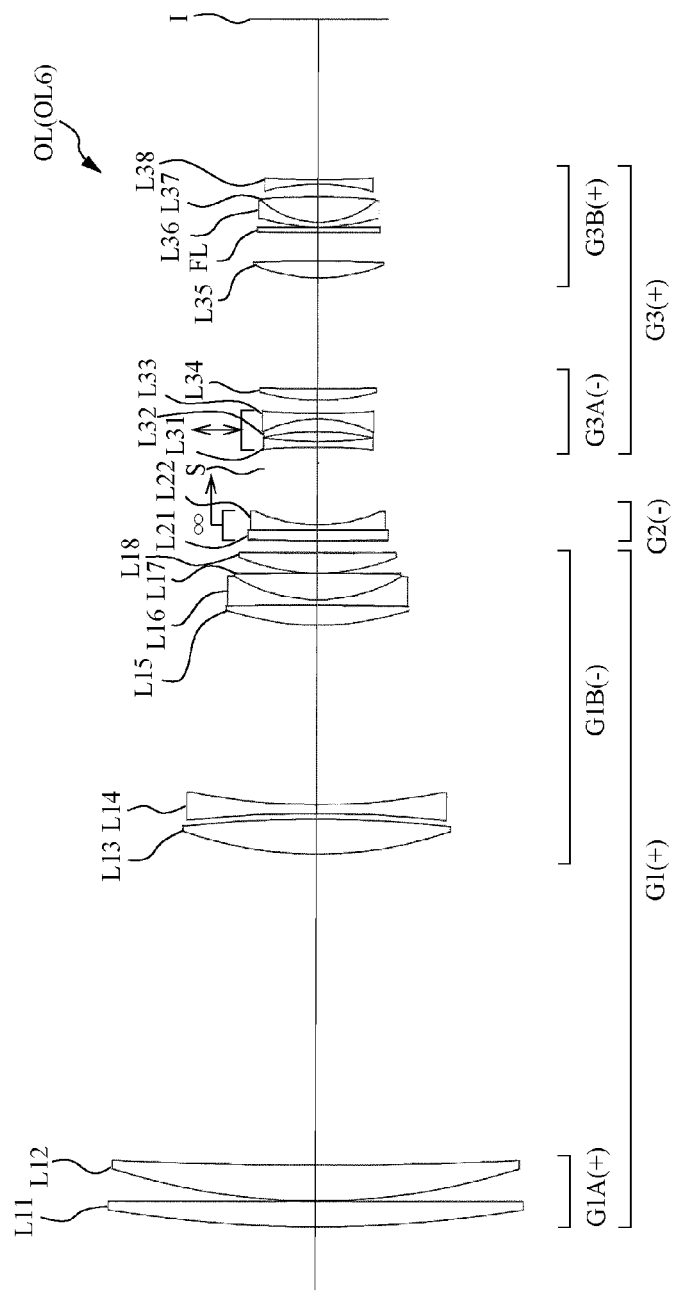
[Fig. 11]

[Fig.12(a)]
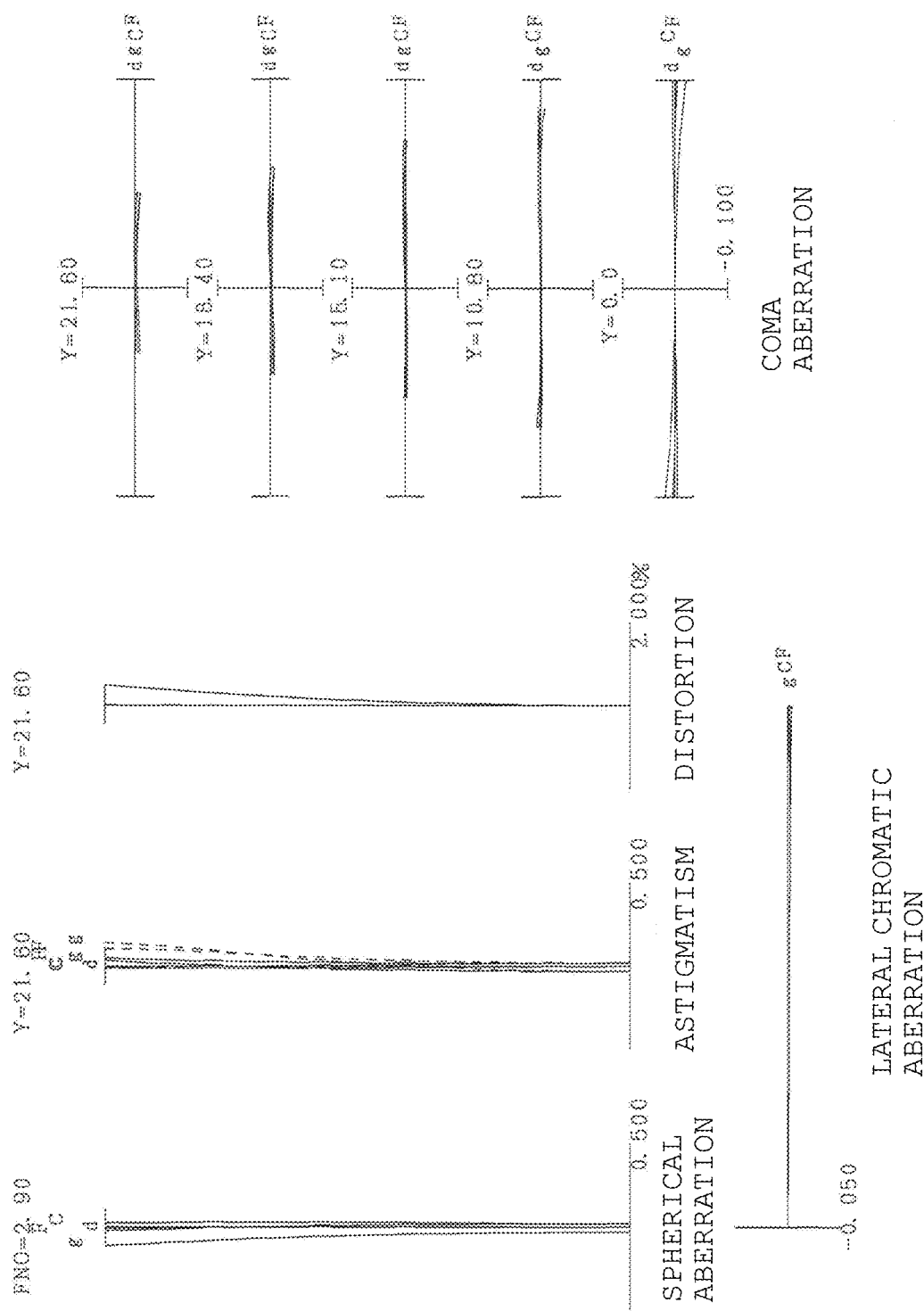

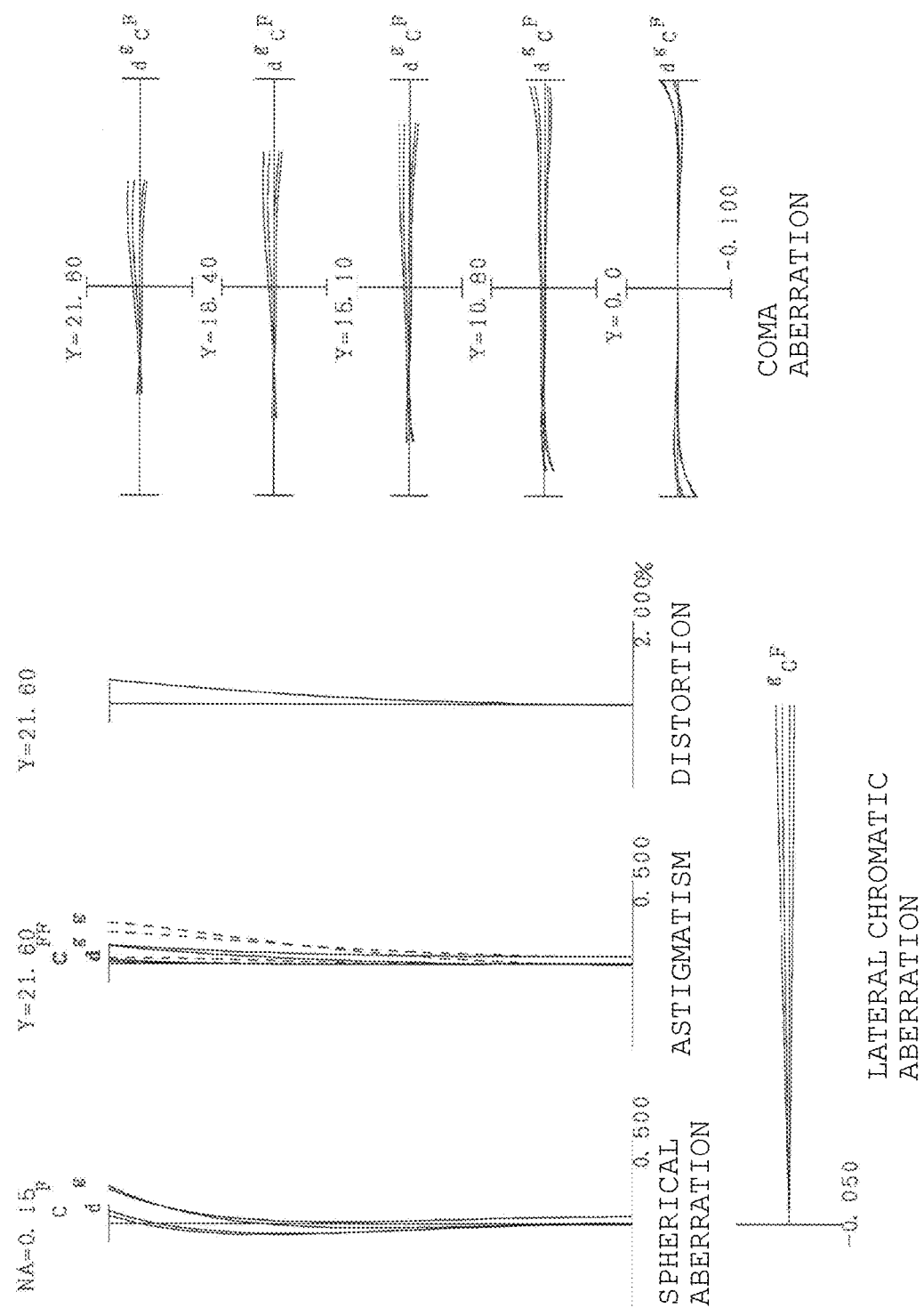
[Fig.12(b)]

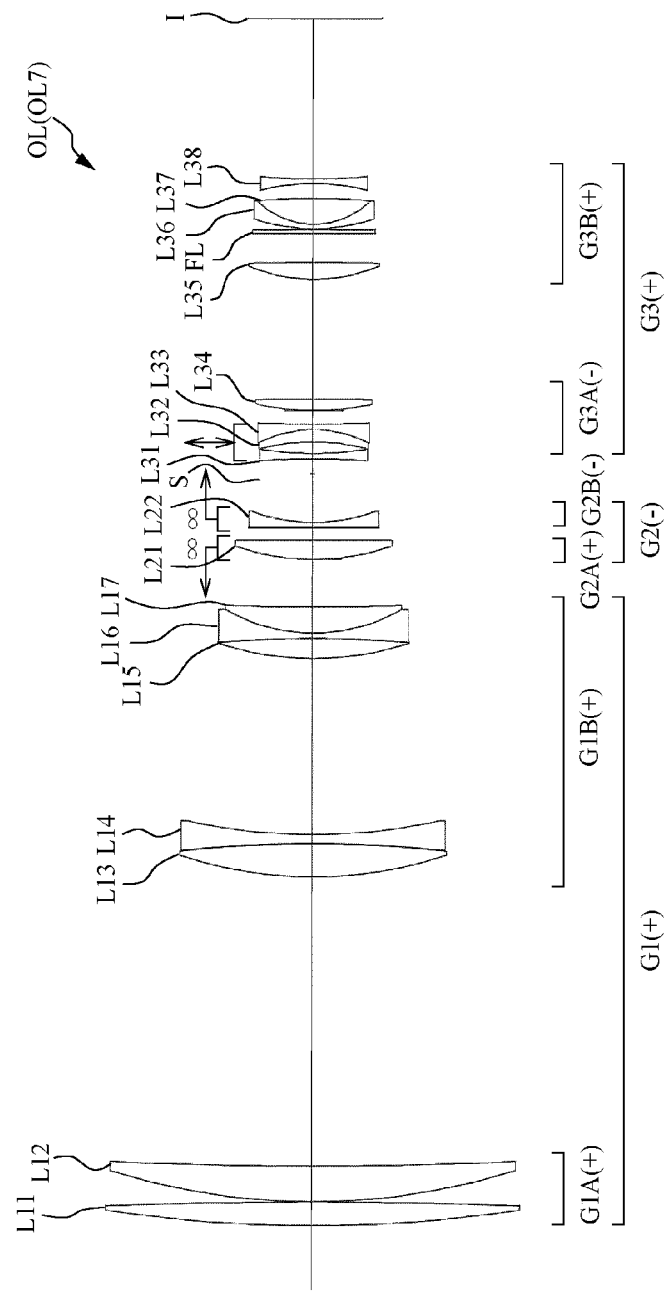
[Fig.13]

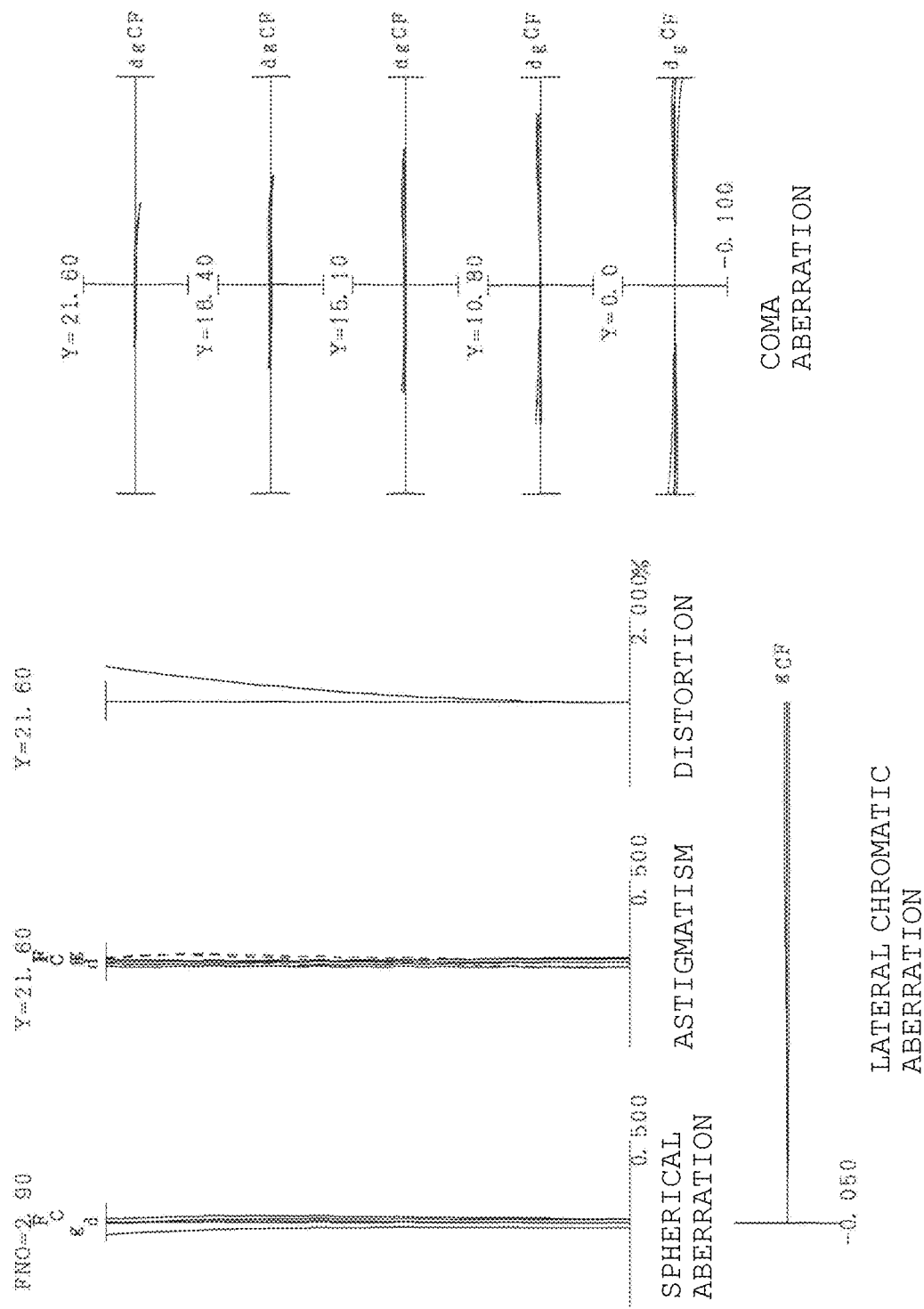
[Fig.14(a)]

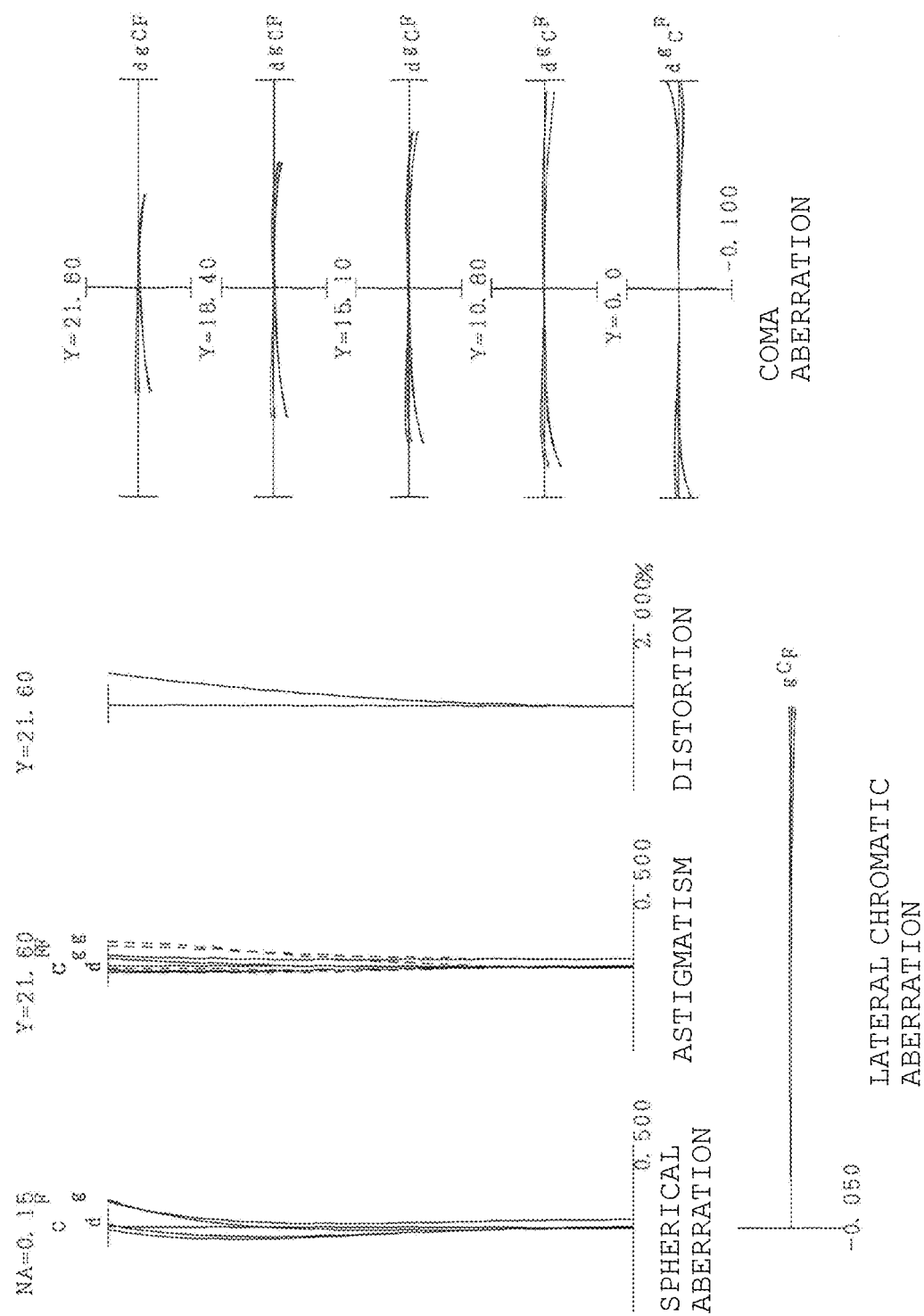
[Fig.14(b)]

[Fig.15]
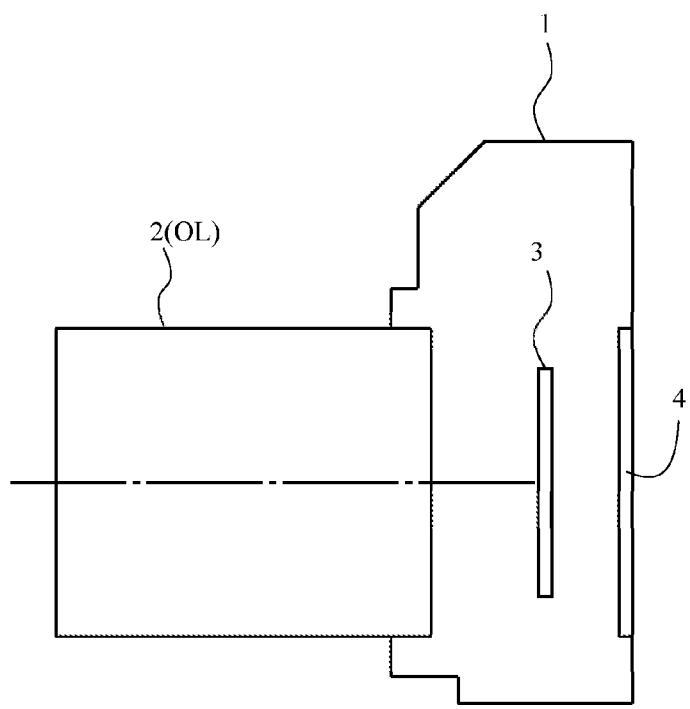

[Fig.16]
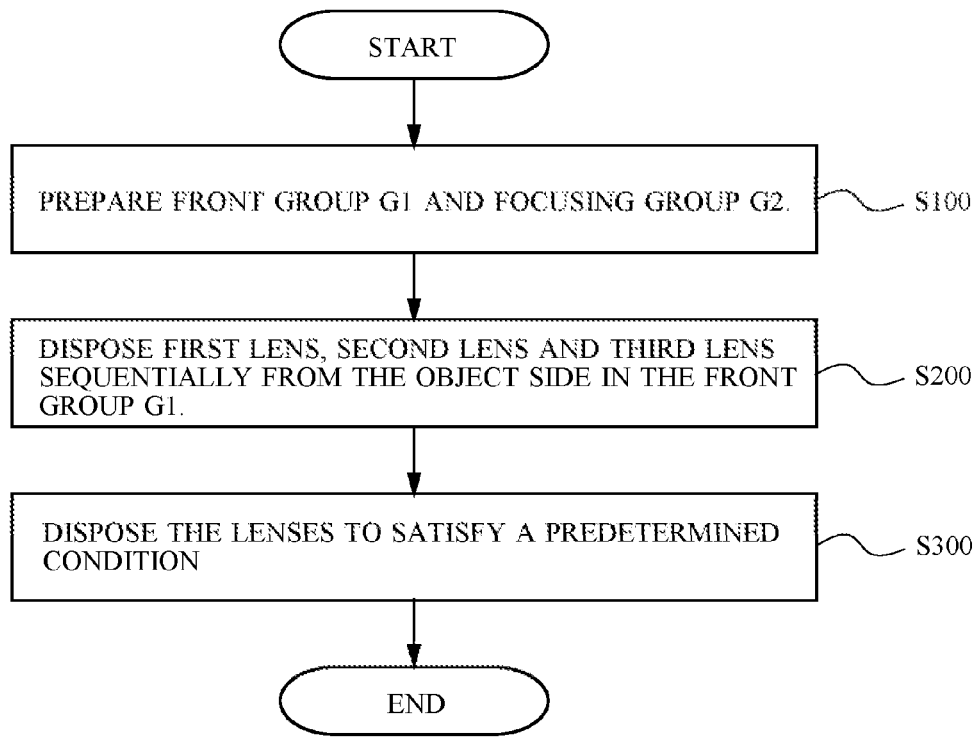

OPTICAL SYSTEM, OPTICAL APPARATUS, AND METHOD FOR MANUFACTURING OPTICAL SYSTEM

TECHNICAL FIELD

The present invention relates to an optical system, an optical apparatus, and a method for manufacturing the optical system.

BACKGROUND ART

Conventionally, an optical system having a small size and a light weight has been desired (see Patent Literature 1, for example). However, further improvement of optical performance is required for an optical system disclosed in Patent Literature 1.

CITATION LIST

Patent Literature

Patent Literature 1: Japanese Patent Laid-open No. 2011-085788

SUMMARY OF INVENTION

An optical system according to a first aspect of the present invention includes: sequentially from an object side, a front group having positive refractive power; and a focusing group that performs focusing by moving in an optical axis direction, the front group includes, sequentially from the object side, a first lens, a second lens, and a third lens, and the optical system satisfies a condition expressed by an expression below, $$0.10 < D23/f1 < 0.75$$

in the expression,
f1: focal length of the front group, and
D23: distance on an optical axis between the second lens and the third lens.

A method for manufacturing the optical system according to the first aspect of the present invention is a method for manufacturing an optical system including, sequentially from an object side, a front group having positive refractive power and a focusing group that performs focusing by moving in an optical axis direction, the method for manufacturing the optical system including: disposing, sequentially from the object side, a first lens, a second lens, and a third lens in the front group; and disposing the lenses so that a condition expressed by an expression below is satisfied, $$0.10 < D23/f1 < 0.75$$

in the expression,
f1: focal length of the front group, and
D23: distance on the optical axis between the second lens and the third lens.

BRIEF DESCRIPTION OF DRAWINGS

FIG. 1 is a cross-sectional view showing a lens configuration of an optical system according to a first example in a state of focusing at infinity.

FIG. 2 shows a variety of aberration diagrams of the optical system according to the first example: (a) shows focusing upon an infinite distance object; and (b) shows focusing upon a close distance object.

FIG. 3 is a cross-sectional view showing a lens configuration of an optical system according to a second example in a state of focusing at infinity.

FIG. 4 shows a variety of aberration diagrams of the optical system according to the second example: (a) shows focusing upon an infinite distance object; and (b) shows focusing upon a close distance object.

FIG. 5 is a cross-sectional view showing a lens configuration of an optical system according to a third example in a state of focusing at infinity.

FIG. 6 shows a variety of aberration diagrams of the optical system according to the third example: (a) shows focusing upon an infinite distance object; and (b) shows focusing upon a close distance object.

FIG. 7 is a cross-sectional view showing a lens configuration of an optical system according to a fourth example in a state of focusing at infinity.

FIG. 8 shows a variety of aberration diagrams of the optical system according to the fourth example: (a) shows focusing upon an infinite distance object; and (b) shows focusing upon a close distance object.

FIG. 9 is a cross-sectional view showing a lens configuration of an optical system according to a fifth example in a state of focusing at infinity.

FIG. 10 shows a variety of aberration diagrams of the optical system according to the fifth example: (a) shows focusing upon an infinite distance object; and (b) shows focusing upon a close distance object.

FIG. 11 is a cross-sectional view showing a lens configuration of an optical system according to a sixth example in a state of focusing at infinity.

FIG. 12 shows a variety of aberration diagrams of the optical system according to the sixth example: (a) shows focusing upon an infinite distance object; and (b) shows focusing upon a close distance object.

FIG. 13 is a cross-sectional view showing a lens configuration of an optical system according to a seventh example in a state of focusing at infinity.

FIG. 14 shows a variety of aberration diagrams of the optical system according to the seventh example: (a) shows focusing upon an infinite distance object; and (b) shows focusing upon a close distance object.

FIG. 15 is a cross-sectional view of a camera on which an above-described optical system is mounted.

FIG. 16 is a flowchart for description of a method for manufacturing the above-described optical system.

DESCRIPTION OF EMBODIMENTS

Preferable embodiments will be described below with reference to the drawings.

As shown in FIG. 1, an optical system OL according to the present embodiment includes, sequentially from an object side, a front group G1 having positive refractive power and a focusing group G2 that performs focusing by moving in an optical axis direction. The front group G1 includes, sequentially from the object side, a first lens L11 having positive refractive power, a second lens L12 having positive refractive power, and a third lens L13. With this configuration, it is possible to favorably correct aberration of the optical system OL and achieve size reduction and weight reduction.

Moreover, the optical system OL according to the present embodiment desirably satisfies Conditional Expression (1) shown below.

$$0.10 < D23/f1 < 0.75 \tag{1}$$

In the expression, fl: focal length of the front group G1, and

D23: distance on the optical axis between the second lens L12 and the third lens L13.

Conditional Expression (1) defines the ratio of the distance on the optical axis between the second lens L12 and the third lens L13 included in the front group G1 relative to the focal length of the front group G1. When Conditional Expression (1) is satisfied, it is possible to favorably correct a variety of aberrations such as coma aberration, longitudinal chromatic aberration, and lateral chromatic aberration, in particular. When the lower limit value of Conditional Expression (1) is exceeded, the distance on the optical axis between the second lens L12 and the third lens L13 is too long, which makes it difficult to achieve aberration correction. Meanwhile, it is possible to secure the advantageous effect of the present embodiment more surely by setting the lower limit value of Conditional Expression (1) to 0.11. Further, in order to secure the advantageous effect of the present embodiment more surely, it is preferable to set the lower limit value of Conditional Expression (1) to 0.13, 0.15, 0.16, and more preferable to 0.17. Moreover, when the upper limit value of Conditional Expression (1) is exceeded, the distance on the optical axis between the second lens L12 and the third lens L13 is too short, which makes it difficult to achieve weight reduction. Meanwhile, it is possible to secure the advantageous effect of the present embodiment more surely by setting the upper limit value of Conditional Expression (1) to 0.73. Further, in order to secure the advantageous effect of the present embodiment more surely, it is preferable to set the upper limit value of Conditional Expression (1) to 0.70, 0.65, 0.60, 0.55, 0.50, 0.48, 0.45, 0.43, and more preferable to 0.41.

Moreover, the optical system OL according to the present embodiment desirably satisfies Conditional Expression (2) shown below.

$$1.00 < fL1/f1 < 6.00 \quad (2)$$

In the expression, fl: focal length of the front group G1, and fL1: focal length of the first lens L11.

Conditional Expression (2) defines the ratio of the focal length of the first lens L11 included in the front group G1 relative to the focal length of the front group G1. When Conditional Expression (2) is satisfied, the first lens L11 can have sufficient refractive power (power), and thus it is possible to favorably correct a variety of aberrations such as spherical aberration and coma aberration, in particular, by decreasing the refractive power (power) of the second lens L12. When the lower limit value of Conditional Expression (2) is exceeded, the refractive power (power) of the first lens L11 is too strong, which makes it difficult to achieve aberration correction. Meanwhile, it is possible to secure the advantageous effect of the present embodiment more surely by setting the lower limit value of Conditional Expression (2) to 1.05. Further, in order to secure the advantageous effect of the present embodiment more surely, it is preferable to set the lower limit value of Conditional Expression (2) to 1.10, 1.15, 1.20, 1.25, 1.30, 1.33, and more preferable to 1.35. Moreover, when the upper limit value of Conditional Expression (2) is exceeded, the refractive power (power) of the first lens L11 is too weak, which makes it difficult to achieve aberration correction. Meanwhile, it is possible to secure the advantageous effect of the present embodiment more surely by setting the upper limit value of Conditional Expression (2) to 5.80. Further, in order to secure the advantageous effect of the present embodiment more surely, it is preferable to set the upper limit value of Conditional Expression (2) to 5.50, 5.00, 4.50, 4.00, 3.80, and more preferable to 3.50.

Moreover, the optical system OL according to the present embodiment desirably satisfies Conditional Expression (3) shown below.

$$75.00 < vL2 < 100.00 \quad (3)$$

In the expression, vL2: Abbe number of the medium of the second lens L12 at a d line.

Conditional Expression (3) defines the Abbe number of the medium of the second lens L12 included in the front group G1 at the d line. When Conditional Expression (3) is satisfied, it is possible to favorably correct chromatic aberrations of the entire optical system OL, such as longitudinal chromatic aberration and lateral chromatic aberration, in particular. When the lower limit value of Conditional Expression (3) is exceeded, dispersion of the second lens L12 is too large, which makes it difficult to achieve chromatic aberration correction. Meanwhile, it is possible to secure the advantageous effect of the present embodiment more surely by setting the lower limit value of Conditional Expression (3) to 78.00. Further, in order to secure the advantageous effect of the present embodiment more surely, it is preferable to set the lower limit value of Conditional Expression (3) to 80.00, 85.00, 88.00, 90.00, 92.00, and more preferable to 95.00. Moreover, when the upper limit value of Conditional Expression (3) is exceeded, dispersion of the second lens L12 is too small, which makes it difficult to achieve chromatic aberration correction. Meanwhile, it is possible to secure the advantageous effect of the present embodiment by setting the upper limit value of Conditional Expression (3) to 98.00. Further, in order to secure the advantageous effect of the present embodiment, it is preferable to set the upper limit value of Conditional Expression (3) to 97.00.

Moreover, the optical system OL according to the present embodiment desirably satisfies Conditional Expression (4) shown below.

$$75.00 < vL3 < 100.00 \quad (4)$$

In the expression, vL3: Abbe number of the medium of the third lens L13 at the d line.

Conditional Expression (4) defines the Abbe number of the medium of the third lens L13 included in the front group G1 at the d line. When Conditional Expression (4) is satisfied, it is possible to favorably correct chromatic aberrations of the entire optical system OL, such as longitudinal chromatic aberration and lateral chromatic aberration, in particular. When the lower limit value of Conditional Expression (4) is exceeded, dispersion of the third lens L13 is too large, which makes it difficult to achieve chromatic aberration correction. Meanwhile, it is possible to secure the advantageous effect of the present embodiment more surely by setting the lower limit value of Conditional Expression (4) to 78.00. Further, in order to secure the advantageous effect of the present embodiment more surely, it is preferable to set the lower limit value of Conditional Expression (4) to 80.00, 85.00, 88.00, 90.00, 92.00, and more preferable to 95.00. Moreover, when the upper limit value of Conditional Expression (4) is exceeded, dispersion of the third lens L13 is too small, which makes it difficult to achieve chromatic aberration correction. Meanwhile, it is possible to secure the advantageous effect of the present embodiment by setting the upper limit value of Conditional Expression (4) to 98.00.

Further, in order to secure the advantageous effect of the present embodiment, it is preferable to set the upper limit value of Conditional Expression (4) to 97.00.

Moreover, the optical system OL according to the present embodiment desirably satisfies Conditional Expression (5) shown below.

$$0.001 < TL1/fL1 < 0.025 \quad (5)$$

In the expression, fL1: focal length of the first lens L11, and

TL1: thickness of the first lens L11 on the optical axis.

Conditional Expression (5) defines the ratio of the thickness of the first lens L11 included in the front group G1 on the optical axis relative to the focal length thereof. When Conditional Expression (5) is satisfied, it is possible to achieve weight reduction of the optical system OL and also favorably correct a variety of aberrations such as spherical aberration and coma aberration, in particular. When the lower limit value of Conditional Expression (5) is exceeded, the refractive power (power) of the first lens L11 is weak, and thus it is difficult to achieve aberration correction when the thickness of the first lens L11 is reduced. Meanwhile, it is possible to secure the advantageous effect of the present embodiment more surely by setting the lower limit value of Conditional Expression (5) to 0.002. Further, in order to secure the advantageous effect of the present embodiment more surely, it is preferable to set the lower limit value of Conditional Expression (5) to 0.003, 0.004, 0.005, and more preferable to 0.006. Moreover, when the upper limit value of Conditional Expression (5) is exceeded, the refractive power (power) of the first lens L11 is strong, and thus it is difficult to achieve aberration correction when the thickness of the first lens L11 is increased. Meanwhile, it is possible to secure the advantageous effect of the present embodiment by setting the upper limit value of Conditional Expression (5) to 0.023. Further, in order to secure the advantageous effect of the present embodiment more surely, it is preferable to set the upper limit value of Conditional Expression (5) to 0.020, 0.019, 0.018, 0.017, 0.016, and more preferable to 0.015.

Moreover, the optical system OL according to the present embodiment desirably satisfies Conditional Expression (6) shown below.

$$0.010 < TL2/fL2 < 0.035 \quad (6)$$

In the expression, fL2: focal length of the second lens L12, and

TL2: thickness of the second lens L12 on the optical axis.

Conditional Expression (6) defines the ratio of the thickness of the second lens L12 included in the front group G1 on the optical axis relative to the focal length thereof. When Conditional Expression (6) is satisfied, it is possible to achieve weight reduction of the optical system OL and also favorably correct a variety of aberrations such as spherical aberration and coma aberration, in particular. When the lower limit value of Conditional Expression (6) is exceeded, the refractive power (power) of the second lens L12 is weak, and thus it is difficult to achieve aberration correction when the thickness of the second lens L12 is reduced. Meanwhile, it is possible to secure the advantageous effect of the present embodiment more surely by setting the lower limit value of Conditional Expression (6) to 0.012. Further, in order to secure the advantageous effect of the present embodiment more surely, it is preferable to set the lower limit value of Conditional Expression (6) to 0.014, 0.015, 0.016, and more preferable to 0.017. Moreover, when the upper limit value of Conditional Expression (6) is exceeded, the refractive power (power) of the second lens L12 is strong, and thus it is difficult to achieve aberration correction when the thickness of the second lens L12 is increased. Meanwhile, it is possible to secure the advantageous effect of the present embodiment by setting the upper limit value of Conditional Expression (6) to 0.033. Further, in order to secure the advantageous effect of the present embodiment more surely, it is preferable to set the upper limit value of Conditional Expression (6) to 0.030, 0.028, 0.026, and more preferable to 0.025.

Moreover, in the optical system OL according to the present embodiment, the front group G1 preferably includes, sequentially from the object side, a front-group A group G1A and a front-group B group G1B between which the largest air space on the optical axis in the front group G1 is interposed. With this configuration in which the front-group A group G1A and the front-group B group G1B are included in the front group G1, it is possible to favorably correct aberration in the front group G1.

Moreover, the optical system OL according to the present embodiment desirably satisfies Conditional Expression (7) shown below.

$$-1.00 < f/f1B < 5.00 \quad (7)$$

In the expression, f: overall focal length of the optical system OL in a state of focusing at infinity, and f1B: focal length of the front-group B group G1B.

Conditional Expression (7) defines the ratio of the overall focal length of the optical system OL in the state of focusing at infinity relative to the focal length of the front-group B group G1B. When Conditional Expression (7) is satisfied, it is possible to achieve weight reduction of the optical system OL. Moreover, it is possible to achieve weight reduction and correction of a variety of aberrations such as spherical aberration and coma aberration, in particular, in a proper balance. When the lower limit value of Conditional Expression (7) is exceeded, the refractive power (power) of the front-group B group G1B is strong, and thus it is difficult to achieve aberration correction when the thickness of the front-group B group G1B is increased. Meanwhile, it is possible to secure the advantageous effect of the present embodiment more surely by setting the lower limit value of Conditional Expression (7) to −0.90. Further, in order to secure the advantageous effect of the present embodiment more surely, it is preferable to set the lower limit value of Conditional Expression (7) to −0.80, −0.70, −0.60, −0.50, −0.45, −0.40, more preferable to −0.35. Moreover, when the upper limit value of Conditional Expression (7) is exceeded, the refractive power (power) of the front-group B group G1B is weak, and thus it is difficult to achieve aberration correction when the thickness of the front-group B group G1B is reduced. Meanwhile, it is possible to secure the advantageous effect of the present embodiment by setting the upper limit value of Conditional Expression (7) to 4.50. Further, in order to secure the advantageous effect of the present embodiment more surely, it is preferable to set the upper limit value of Conditional Expression (7) to 4.00, 3.50, 3.30, 3.00, 2.80, 2.50, 2.30, and more preferable to 2.20.

Moreover, the optical system OL according to the present embodiment desirably satisfies Conditional Expression (8) shown below.

$$-1.00 < f1/f1B < 3.00 \quad (8)$$

In the expression, f1: focal length of the front group G1, and f1B: focal length of the front-group B group G1B Conditional Expression (8) defines the ratio of the focal length of the front group G1 relative to the focal length of the front-group B group G1B. When Conditional Expression (8) is satisfied, it is possible to achieve weight reduction of the optical system OL. Moreover, it is possible to achieve weight reduction and correction of a variety of aberrations such as spherical aberration and coma aberration, in particular, in a proper balance. When the lower limit value of Conditional Expression (8) is exceeded, the refractive power (power) of the front-group B group G1B is strong, and thus it is difficult to achieve aberration correction when the thickness of the front-group B group G1B is increased. Meanwhile, it is possible to secure the advantageous effect of the present embodiment more surely by setting the lower limit value of Conditional Expression (8) to −0.90. Further, in order to secure the advantageous effect of the present embodiment more surely, it is preferable to set the lower limit value of Conditional Expression (8) to −0.80, −0.70, −0.60, −0.50, −0.48, −0.45, more preferable to −0.42. Moreover, when the upper limit value of Conditional Expression (8) is exceeded, the refractive power (power) of the front-group B group G1B is weak, and thus it is difficult to achieve aberration correction when the thickness of the front-group B group G1B is reduced. Meanwhile, it is possible to secure the advantageous effect of the present embodiment by setting the upper limit value of Conditional Expression (8) to 2.80. Further, in order to secure the advantageous effect of the present embodiment more surely, it is preferable to set the upper limit value of Conditional Expression (8) to 2.50, 2.30, 2.00, 1.90, 1.85, 1.80, and more preferable to 1.78.

Moreover, the optical system OL according to the present embodiment desirably satisfies Conditional Expression (9) shown below.

$$0.50 < f1A/f < 1.50 \quad (9)$$

In the expression,
f: overall focal length of the optical system OL in the state of focusing at infinity, and
f1A: focal length of the front-group A group G1A.

Conditional Expression (9) defines the ratio of the focal length of the front-group A group G1A relative to the overall focal length of the optical system OL in the state of focusing at infinity. When Conditional Expression (9) is satisfied, it is possible to achieve weight reduction of the optical system OL. Moreover, it is possible to achieve weight reduction and correction of a variety of aberrations such as spherical aberration and coma aberration, in particular, in a proper balance. When the lower limit value of Conditional Expression (9) is exceeded, the refractive power (power) of the front-group A group G1A is weak, and thus it is difficult to achieve aberration correction when the thickness of the front-group A group G1A is reduced. Meanwhile, it is possible to secure the advantageous effect of the present embodiment more surely by setting the lower limit value of Conditional Expression (9) to 0.52. Further, in order to secure the advantageous effect of the present embodiment more surely, it is preferable to set the lower limit value of Conditional Expression (9) to 0.54, 0.55, 0.56, 0.57, 0.58, and more preferable to 0.59. Moreover, when the upper limit value of Conditional Expression (9) is exceeded, the refractive power (power) of the front-group A group G1A is strong, and thus it is difficult to achieve aberration correction when the thickness of the front-group A group G1A is increased. Meanwhile, it is possible to secure the advantageous effect of the present embodiment by setting the upper limit value of Conditional Expression (9) to 1.40. Further, in order to secure the advantageous effect of the present embodiment more surely, it is preferable to set the upper limit value of Conditional Expression (9) to 1.30, 1.20, 1.10, 1.00, 0.98, 0.97, and more preferable to 0.96.

Moreover, the optical system OL according to the present embodiment desirably satisfies Conditional Expression (10) shown below.

$$0.50 < f1A/f1 < 2.50 \quad (10)$$

In the expression,
f1: focal length of the front group G1, and
f1A: focal length of the front-group A group G1A.

Conditional Expression (10) defines the ratio of the focal length of the front-group A group G1A relative to the focal length of the front group G1. When Conditional Expression (10) is satisfied, it is possible to achieve weight reduction of the optical system OL. Moreover, it is possible to achieve weight reduction and correction of a variety of aberrations such as spherical aberration and coma aberration, in particular, in a proper balance. When the lower limit value of Conditional Expression (10) is exceeded, the refractive power (power) of the front-group A group G1A is weak, and thus it is difficult to achieve aberration correction when the thickness the front-group A group G1A is reduced. Meanwhile, it is possible to secure the advantageous effect of the present embodiment more surely by setting the lower limit value of Conditional Expression (10) to 0.52. Further, in order to secure the advantageous effect of the present embodiment more surely, it is preferable to set the lower limit value of Conditional Expression (10) to 0.54, 0.55, 0.58, 0.60, 0.62, 0.65, and more preferable to 0.67. Moreover, when the upper limit value of Conditional Expression (10) is exceeded, the refractive power (power) of the front-group A group G1A is strong, and thus it is difficult to achieve aberration correction when the thickness of the front-group A group G1A is increased. Meanwhile, it is possible to secure the advantageous effect of the present embodiment by setting the upper limit value of Conditional Expression (10) to 2.45. Further, in order to secure the advantageous effect of the present embodiment more surely, it is preferable to set the upper limit value of Conditional Expression (10) to 2.40, 2.35, 2.30, 2.25, 2.20, 2.15, 2.10, 2.08, and more preferable to 2.06.

Moreover, the optical system OL according to the present embodiment desirably satisfies Conditional Expression (11) shown below.

$$-0.50 < f1A/f1B < 3.00 \quad (11)$$

In the expression,
f1A: focal length of the front-group A group G1A, and
f1B: focal length of the front-group B group G1B.

Conditional Expression (11) defines the ratio of the focal length of the front-group A group G1A relative to the focal length of the front-group B group G1B. When Conditional Expression (11) is satisfied, it is possible to achieve weight reduction of the optical system OL. Moreover, it is possible to achieve weight reduction and correction of a variety of aberrations such as spherical aberration and coma aberration, in particular, in a proper balance. When the lower limit value of Conditional Expression (11) is exceeded, the refractive power (power) of the front-group A group G1A is weak and the refractive power (power) of the front-group B group G1B is strong, which makes it difficult to achieve aberration correction. Meanwhile, it is possible to secure the advantageous effect of the present embodiment more surely by setting the lower limit value of Conditional Expression (11) to −0.48. Further, in order to secure the advantageous effect of the present embodiment more surely, it is preferable to set the lower limit value of Conditional Expression (11) to −0.45, −0.43, −0.40, −0.38, −0.35, −0.33, −0.30, and more preferable to −0.28. Moreover, when the upper limit value of Conditional Expression (11) is exceeded, the refractive power (power) of the front-group A group G1A is strong and the refractive power (power) of the front-group B group G1B is weak, which makes it difficult to achieve aberration correction. Meanwhile, it is possible to secure the advantageous effect of the present embodiment by setting the upper limit value of Conditional Expression (11) to 2.80. Further, in order to secure the advantageous effect of the present embodiment more surely, it is preferable to set the upper limit value of Conditional Expression (11) to 2.50, 2.30, 2.00, 1.80, 1.50, 1.30, and more preferable to 1.20.

Moreover, in the optical system OL according to the present embodiment, the front group G1 preferably includes at least one negative lens (hereinafter, referred to as a "specific negative lens") that satisfies Conditional Expressions (12) and (13) shown below.

$$-0.015 < \theta gFn - 0.6558 + 0.001982 \times vdn < 0.000 \quad (12)$$

$$vdn < 50.00 \quad (13)$$

In the expressions,
θgFn: partial dispersion ratio of the medium of the specific negative lens, and
vdn: Abbe number of the medium of the specific negative lens at the d line.

Conditional Expression (12) defines the specific negative lens included in the front group G1. It is possible to favorably achieve first-order achromatism and second-order achromatism when the specific negative lens that satisfies Conditional Expression (12) is provided. In addition, it is possible to favorably correct chromatic aberrations of the entire optical system OL, such as longitudinal chromatic aberration and lateral chromatic aberration, in particular. Meanwhile, it is possible to secure the advantageous effect of the present embodiment more surely by setting the lower limit value of Conditional Expression (12) to −0.012. Further, in order to secure the advantageous effect of the present embodiment more surely, it is preferable to set the lower limit value of Conditional Expression (12) to −0.010, −0.008, and more preferable to −0.007. Moreover, it is possible to secure the advantageous effect of the present embodiment more surely by setting the upper limit value of Conditional Expression (12) to −0.001. Further, in order to secure the advantageous effect of the present embodiment more surely, it is preferable to set the upper limit value of Conditional Expression (12) to −0.002, −0.003, and more preferable to −0.004.

Conditional Expression (13) defines the specific negative lens included in the front group G1. It is possible to favorably achieve first-order achromatism and second-order achromatism when the specific negative lens that satisfies Conditional Expression (13) is provided. In addition, it is possible to favorably correct chromatic aberrations of the entire optical system OL, such as longitudinal chromatic aberration and lateral chromatic aberration, in particular. Meanwhile, it is possible to secure the advantageous effect of the present embodiment by setting the upper limit value of Conditional Expression (13) to 48.00. Further, in order to secure the advantageous effect of the present embodiment more surely, it is preferable to set the upper limit value of Conditional Expression (13) to 45.00, 43.00, 40.00, and more preferable to 38.00.

Moreover, in the optical system OL according to the present embodiment, the front group G1 preferably includes at least one positive lens (hereinafter referred to as a "specific positive lens") that satisfies Conditional Expressions (14), (15), and (16) shown below.

$$20.00 < vdp < 30.00 \quad (14)$$

$$1.830 < ndp + 0.01425 \times vdp < 2.120 \quad (15)$$

$$0.7020 < \theta gFp + 0.00316 \times vdp \quad (16)$$

In the expressions,
vdp: Abbe number of the medium of the specific positive lens at the d line,
ndp: refractive index of the medium of the specific positive lens at the d line, and
θgFp: partial dispersion ratio of the medium of the specific positive lens.

Conditional Expression (14) defines the specific positive lens included in the front group G1. It is possible to favorably achieve first-order achromatism and second-order achromatism when the specific positive lens that satisfies Conditional Expression (14) is provided. In addition, it is possible to favorably correct chromatic aberrations of the entire optical system OL, such as longitudinal chromatic aberration and lateral chromatic aberration, in particular. Meanwhile, it is possible to secure the advantageous effect of the present embodiment more surely by setting the lower limit value of Conditional Expression (14) to 22.00. Further, in order to secure the advantageous effect of the present embodiment more surely, it is preferable to set the lower limit value of Conditional Expression (14) to 24.00, 25.00, and more preferable to 26.00. Moreover, it is possible to secure the advantageous effect of the present embodiment more surely by setting the upper limit value of Conditional Expression (14) to 29.00. Further, in order to secure the advantageous effect of the present embodiment more surely, it is preferable to set the upper limit value of Conditional Expression (14) to 28.00, and more preferable to 27.50.

Conditional Expression (15) defines the specific positive lens included in the front group G1. It is possible to favorably achieve first-order achromatism and second-order achromatism when the specific positive lens that satisfies Conditional Expression (15) is provided. In addition, it is possible to favorably correct chromatic aberrations of the entire optical system OL, such as longitudinal chromatic aberration and lateral chromatic aberration, in particular. Meanwhile, it is possible to secure the advantageous effect of the present embodiment more surely by setting the lower limit value of Conditional Expression (15) to 1.850. Further, in order to secure the advantageous effect of the present embodiment more surely, it is preferable to set the lower limit value of Conditional Expression (15) to 1.900, 1.950, 1.980, 2.000, 2.020, and more preferable to 2.040. Moreover, it is possible to secure the advantageous effect of the present embodiment more surely by setting the upper limit value of Conditional Expression (15) to 2.100. Further, in order to secure the advantageous effect of the present embodiment more surely, it is preferable to set the upper limit value of Conditional Expression (15) to 2.090, 2.080, 2.070, and more preferable to 2.060.

Conditional Expression (16) defines the specific positive lens included in the front group G1. It is possible to favorably achieve first-order achromatism and second-order achromatism when the specific positive lens that satisfies Conditional Expression (16) is provided. In addition, it is possible to favorably correct chromatic aberrations of the entire optical system OL, such as longitudinal chromatic aberration and lateral chromatic aberration, in particular.

Meanwhile, it is possible to secure the advantageous effect of the present embodiment more surely by setting the lower limit value of Conditional Expression (16) to 0.7050. Further, in order to secure the advantageous effect of the present embodiment more surely, it is preferable to set the lower limit value of Conditional Expression (16) to 0.7080, 0.7100, 0.7120, 0.7150, and more preferable to 0.7160.

Moreover, the optical system OL according to the present embodiment desirably satisfies Conditional Expression (17) shown below.

$$-0.60 < f2/f < 0.60 \quad (17)$$

In the expression,
f: overall focal length of the optical system OL in the state of focusing at infinity, and
f2: focal length of the focusing group G2.

Conditional Expression (17) defines the ratio of the focal length of the focusing group G2 relative to the overall focal length of the optical system OL in the state of focusing at infinity. When the focal length of the focusing group G2 changes depending on the state of focusing, its value in the state of focusing at infinity is used. When Conditional Expression (17) is satisfied, it is possible to reduce aberration variation at focusing. Meanwhile, it is possible to secure the advantageous effect of the present embodiment more surely by setting the lower limit value of Conditional Expression (17) to −0.58. Further, in order to secure the advantageous effect of the present embodiment more surely, it is preferable to set the lower limit value of Conditional Expression (17) to −0.56, −0.55, −0.54, and more preferable to −0.53. Moreover, it is possible to secure the advantageous effect of the present embodiment more surely by setting the upper limit value of Conditional Expression (17) to 0.58. Further, in order to secure the advantageous effect of the present embodiment more surely, it is preferable to set the upper limit value of Conditional Expression (17) to 0.55, 0.53, 0.50, 0.48, and more preferable to 0.47.

Furthermore, the optical system OL according to the present embodiment preferably includes a rear group G3 on an image side of the focusing group G2. With this configuration, it is possible to favorably correct a variety of aberrations such as curvature of field, in particular.

Furthermore, the optical system OL according to the present embodiment preferably includes an aperture stop S on the image side of the focusing group G2. With this configuration, a light flux diameter is relatively small, which is effective for size reduction of the optical system OL.

Furthermore, in the optical system OL according to the present embodiment, at least part of the rear group G3 is preferably so moved as to have a displacement component in a direction perpendicular to the optical axis. With this configuration, the light flux diameter is relatively small, which is effective for size reduction of the optical system OL. In addition, it is possible to reduce aberration variation when a shake of a hand is corrected by moving at least part of the rear group G3 so as to have a displacement component in a direction perpendicular to the optical axis (anti-vibration).

Moreover, in the optical system OL according to the present embodiment, the rear group G3 preferably includes, sequentially from the object side, a rear-group A group G3A and a rear-group B group G3B between which the largest air space on the optical axis in the rear group G3 is interposed. With this configuration, it is possible to favorably correct a variety of aberrations such as coma aberration and curvature of field, in particular.

Moreover, the optical system OL according to the present embodiment desirably satisfies Conditional Expression (18) shown below.

$$-4.00 < f3/f3A < 7.00 \quad (18)$$

In the expression,
f3: focal length of the rear group G3, and
f3A: focal length of the rear-group A group G3A.

Conditional Expression (18) defines the ratio of the focal length of the rear group G3 relative to the focal length of the rear-group A group G3A. When Conditional Expression (18) is satisfied, it is possible to favorably correct a variety of aberrations such as spherical aberration and coma aberration, in particular. When the lower limit value of Conditional Expression (18) is exceeded, the refractive power (power) of the rear-group A group G3A is strong, which makes it difficult to achieve aberration correction. Meanwhile, it is possible to secure the advantageous effect of the present embodiment more surely by setting the lower limit value of Conditional Expression (18) to −3.80. Further in order to secure the advantageous effect of the present embodiment more surely, it is preferable to set the lower limit value of Conditional Expression (18) to −3.50, −3.30, −3.00, −2.80, −2.50, −2.30, −2.00, and more preferable to −1.80. Moreover, when the upper limit value of Conditional Expression (18) is exceeded, the refractive power (power) of the rear-group A group G3A is weak, which makes it difficult to achieve aberration correction. Meanwhile, it is possible to secure the advantageous effect of the present embodiment by setting the upper limit value of Conditional Expression (18) to 6.50. Further, in order to secure the advantageous effect of the present embodiment more surely, it is preferable to set the upper limit value of Conditional Expression (18) to 6.00, 5.50, 5.00, 4.80, 4.50, 4.30, 4.00, 3.80, 3.50, and more preferable to 3.30.

Moreover, the optical system OL according to the present embodiment desirably satisfies Conditional Expression (19) shown below.

$$-3.00 < f3/f3B < 5.00 \quad (19)$$

In the expression,
f3: focal length of the rear group G3, and
f3B: focal length of the rear-group B group G3B.

Conditional Expression (19) defines the ratio of the focal length of the rear group G3 relative to the focal length of the rear-group B group G3B. When Conditional Expression (19) is satisfied, it is possible to favorably correct a variety of aberrations such as coma aberration and curvature of field, in particular. When the lower limit value of Conditional Expression (19) is exceeded, the refractive power (power) of the rear-group B group G3B is strong, which makes it difficult to achieve aberration correction. Meanwhile, it is possible to secure the advantageous effect of the present embodiment more surely by setting the lower limit value of Conditional Expression (19) to −2.80. Further, in order to secure the advantageous effect of the present embodiment more surely, it is preferable to set the lower limit value of Conditional Expression (19) to −2.50, −2.30, −2.00, −1.80, and more preferable to −1.60. Moreover, when the upper limit value of Conditional Expression (18) is exceeded, the refractive power (power) of the rear-group B group G3B is weak, which makes it difficult to achieve aberration correction. Meanwhile, it is possible to secure the advantageous effect of the present embodiment by setting the upper limit value of Conditional Expression (19) to 4.80. Further, in order to secure the advantageous effect of the present embodiment more surely, it is preferable to set the upper limit value of Conditional Expression (19) to 4.50, 4.30, 4.00, 3.80, 3.50, 3.30, 3.00, 2.80, and more preferable to 2.50.

Moreover, the optical system OL according to the present embodiment desirably satisfies Conditional Expression (20) shown below.

$$0.70 < TL/f < 1.10 \quad (20)$$

In the expression, f: overall focal length of the optical system OL in the state of focusing at infinity, and TL: total length of the optical system OL in the state of focusing at infinity.

Conditional Expression (20) defines the ratio of the total length of the optical system OL relative to the overall focal length thereof in the state of focusing at infinity. When Conditional Expression (20) is satisfied, it is possible to achieve weight reduction of the optical system OL and correction of a variety of aberrations in a proper balance. Meanwhile, it is possible to secure the advantageous effect of the present embodiment more surely by setting the lower limit value of Conditional Expression (20) to 0.72. Further, in order to secure the advantageous effect of the present embodiment more surely, it is preferable to set the lower limit value of Conditional Expression (20) to 0.74, 0.75, 0.76, 0.78, and more preferable to 0.79. Moreover, it is possible to secure the advantageous effect of the present embodiment more surely by setting the upper limit value of Conditional Expression (20) to 1.09. Further, in order to secure the advantageous effect of the present embodiment more surely, it is preferable to set the upper limit value of Conditional Expression (29) to 1.08, 1.07, and more preferable to 1.06.

Moreover, the optical system OL according to the present embodiment desirably satisfies Conditional Expression (21) shown below.

$$0.02 < (-fr)/f < 0.35 \quad (21)$$

In the expression, f: overall focal length of the optical system OL in the state of focusing at infinity, and fr: focal length of a lens having negative refractive power and disposed closest to the image side.

Conditional Expression (21) defines the ratio of the focal length of the lens having negative refractive power and disposed closest to the image side relative to the overall focal length of the optical system OL in the state of focusing at infinity. When Conditional Expression (21) is satisfied, it is possible to effectively perform control of the exit pupil position and correction of curvature of field. Meanwhile, it is possible to secure the advantageous effect of the present embodiment more surely by setting the lower limit value of Conditional Expression (21) to 0.03. Further, in order to secure the advantageous effect of the present embodiment more surely, it is preferable to set the lower limit value of Conditional Expression (21) to 0.04, 0.05, and more preferable to 0.06. Moreover, it is possible to secure the advantageous effect of the present embodiment more surely by setting the upper limit value of Conditional Expression (21) to 0.34. Further, in order to secure the advantageous effect of the present embodiment more surely, it is preferable to set the upper limit value of Conditional Expression (21) to 0.32, 0.30, 0.29, and more preferable to 0.28.

The configurations and conditions described above each provide the effect described above, and all the configurations and conditions are not necessarily satisfied. An optical system that satisfies any of the configurations and conditions or a combination of any of the configurations and conditions can provide the effects described above.

Subsequently, a camera that is an optical apparatus including the optical system OL according to the present embodiment will be described below with reference to FIG. 15. This camera 1 is what is called a lens-interchangeable mirrorless camera including the optical system OL according to the present embodiment as an image pickup lens 2. In the camera 1, light from a non-illustrated object (subject) is condensed through the image pickup lens 2 and forms a subject image on the image surface of an image unit 3 through a non-illustrated optical low pass filter (OLPF). Then, the subject image is photoelectrically converted by a photoelectric conversion element included in the image unit 3 to generate an image of the subject. This image is displayed at an electronic view finder (EVF) 4 provided to the camera 1. Accordingly, a photographer can observe the subject through the EVF 4.

Furthermore, when a non-illustrated release button is pressed by the photographer, the image photoelectrically converted by the image unit 3 is stored in a non-illustrated memory. In this manner, the photographer can capture an image of the subject with the camera 1. Note that although the example of a mirrorless camera is described in the present embodiment, effects same as those of the above-described camera 1 can be obtained also when the optical system OL according to the present embodiment is mounted on a single-lens reflex camera that includes a quick-return mirror in a camera body and with which a subject is observed through a finder optical system.

The contents described below are employable as appropriate to the extent that the optical performance is not compromised.

In the present embodiment, the optical system OL having a two- or three-group configuration has been shown, and the configuration conditions and others are also applicable to a four-group configuration, a five-group configuration, and other group configurations. Further, the optical system OL may instead have a configuration in which a lens or a lens group closest to the object side is added or a configuration in which a lens or a lens group closest to the image side is added. Specifically, the optical system OL may have a configuration in which a lens group having a fixed position relative to the image plane at magnification change or focusing is added closest to the image plane. The lens group (also simply referred to as a "group") represents a portion including at least one lens separated from another by an air space that changes at magnification change or focusing. A lens component represents a single lens or a cemented lens formed by cementing a plurality of lenses.

A focusing group may be a single lens group, a plurality of lens groups, or a partial lens group moved in the optical axis direction to focus upon from an infinite distance object to a close distance object. In this case, the focusing group can also be used to perform autofocusing and is suitably driven with a motor for autofocusing (such as an ultrasonic wave motor). In particular, any lens other than the focusing group G2 preferably has a fixed position relative to the image plane at focusing. The focusing group is preferably configured as a single lens or one lens component with a load on the motor taken into consideration.

An anti-vibration group may be a lens group or a partial lens group so moved as to have a displacement component in the direction perpendicular to the optical axis or rotated (swung) in an in-plane direction containing the optical axis to correct an image blur caused by a shake of a hand. In particular, it is preferable that the anti-vibration group is at least part of the rear group G3.

A lens surface may be so formed as to be a spherical surface, a flat surface, or an aspheric surface. In the case where a lens surface is a spherical or flat surface, the lens is readily processed, assembled, and adjusted, whereby degradation in the optical performance due to errors in the lens processing, assembly, and adjustment is preferably avoided. Further, even when an image plane is shifted, the amount of degradation in drawing performance is preferably small. In the case where the lens surface is an aspheric surface, the aspheric surface may be any of a ground aspheric surface, a glass molded aspheric surface that is a glass surface so molded in a die as to have an aspheric shape, and a composite aspheric surface that is a glass surface on which aspherically shaped resin is formed. The lens surface may instead be a diffractive surface, or the lenses may be any of a distributed index lens (GRIN lens) or a plastic lens.

The aperture stop S is preferably disposed on the image side of the focusing group G2. Instead, no member as an aperture stop may be provided, and the frame of a lens may serve as the aperture stop.

Further, each lens surface may be provided with an antireflection film having high transmittance over a wide wavelength range to achieve good optical performance that reduces flare and ghost and achieves high contrast.

A method for manufacturing the optical system OL according to the present embodiment will be schematically described below with reference to FIG. 16. First, the front group G1 and the focusing group G2 are prepared (step S100), and the first lens L11 having positive refractive power, the second lens L12 having positive refractive power, and the third lens L13 are disposed sequentially from the object side in the front group G1 (step S200). The lenses are disposed to satisfy a predetermined condition (for example, Conditional Expression (1) described above) (step S300).

Chromatic aberrations such as longitudinal chromatic aberration and lateral chromatic aberration, in particular, among a variety of aberrations frequently occur to a telephoto lens as the focal length increases. To correct such chromatic aberrations, it is typically needed to increase the lens total length and increase the effective diameter of the front group. Thus, a telephoto lens is desired to simultaneously achieve high optical performance and image-capturing convenience and portability. In particular, a method of including, in the first lens group, a low-dispersive material having a small specific gravity and having an anomalous dispersion property and a method of optimizing lens distances in the first lens group have been known as means for size reduction and weight reduction. An image pickup lens that favorably corrects a variety of aberrations such as chromatic aberration, in particular, and has a small size and a light weight has been desired along with recent increase of the number of pixels of an image sensor. With the above-described configurations, it is possible to provide an optical system that favorably corrects a variety of aberrations and achieves size reduction and weight reduction, an optical apparatus including the optical system, and a method for manufacturing the optical system.

EXAMPLES

Examples will be described below with reference to the drawings. Note that FIGS. 1, 3, 5, 7, 9, 11, and 13 are cross-sectional views showing the configurations of optical systems OL (OL1 to OL7) according to the examples and the distribution of refractive indexes.

First Example

FIG. 1 is a diagram showing the configuration of an optical system OL1 according to a first example. The optical system OL1 includes, sequentially from the object side, a front group G1 having positive refractive power, a focusing group G2 having positive refractive power, and a rear group G3 having negative refractive power. The front group G1 includes, sequentially from the object side, a front-group A group G1A and a front-group B group G1B between which the largest air space on the optical axis in the front group G1 is interposed. The rear group G3 includes, sequentially from the object side, a rear-group A group G3A and a rear-group B group G3B between which the largest air space on the optical axis in the rear group G3 is interposed.

The front-group A group G1A of the front group G1 includes, sequentially from the object side, a positive meniscus lens L11 having a convex surface facing the object side and a positive meniscus lens L12 having a convex surface facing the object side.

The front-group B group G1B of the front group G1 includes, sequentially from the object side, a biconvex positive lens L13, a biconcave negative lens L14, a biconvex positive lens L15, and a cemented lens formed by cementing a biconcave negative lens L16 and a positive meniscus lens L17 having a convex surface facing the object side.

The focusing group G2 is formed of a positive meniscus lens L21 having a convex surface facing the object side.

The rear-group A group G3A of the rear group G3 includes, sequentially from the object side, a negative meniscus lens L31 having a convex surface facing the object side, a cemented lens formed by cementing a positive meniscus lens L32 having a concave surface facing the object side and a biconcave negative lens L33, a biconvex positive lens L34, a cemented lens formed by cementing a biconvex positive lens L35 and a negative meniscus lens L36 having a concave surface facing the object side, and a biconcave negative lens L37.

The rear-group B group G3B of the rear group G3 includes, sequentially from the object side, a cemented lens formed by cementing a biconvex positive lens L38 and a negative meniscus lens L39 having a concave surface facing the object side, a positive meniscus lens L310 having a concave surface facing the object side, and a biconcave negative lens L311.

In addition, an aperture stop S is disposed between the negative meniscus lens L31 and the cemented lens formed by cementing the positive meniscus lens L32 and the biconcave negative lens L33 in the rear group G3. In addition, a filter FL is disposed between the biconcave negative lens L37 and the cemented lens formed by cementing the biconvex positive lens L38 and the negative meniscus lens L39.

The optical system OL1 is configured to move the focusing group G2 to the object side at focusing upon from an infinite distance object to a close distance object.

Moreover, the optical system OL1 is configured so that image position change due to vibration of the optical system OL1 is corrected by moving an anti-vibration group so as to have a displacement component in the direction perpendicular to the optical axis, the anti-vibration group including the biconvex positive lens L34 and the cemented lens formed by cementing the biconvex positive lens L35 and the negative meniscus lens L36 in the rear-group A group G3A of the rear group G3.

Table 1 below shows values of specifications of the optical system OL1. In Table 1, the following specifications shown as overall specifications are defined as follows: f represents the overall focal length; FNO represents the F number; 2ω represents the full angle of view [°]; TL represents the total length in the state of focusing at infinity; BF represents the back focus in the state of focusing at infinity; and Y represents the image height. The total length TL represents the distance on the optical axis from a lens surface (first surface) closest to the object side to an image plane I. The back focus BF represents the distance (air-conversion length) on the optical axis from an optical surface (thirty-seventh surface) closest to the image plane to the image plane I. In the lens data, a first field m shows the sequence of lens surfaces (surface numbers) counted from the object side in a direction in which the rays travel. A second field r shows the radius of curvature of each lens surface. A third field d shows the distance (inter-surface distance) on the optical axis from each optical surface to the following optical surface. A fourth field nd and a fifth field vd show the refractive index and the Abbe number at the d line (λ=587.6 nm). A sixth field θgF shows the second-order dispersion. A radius of curvature of 0.0000 represents a flat surface, and the refractive index of air, which is 1.000000, is omitted. The second-order dispersion is shown only for the specific negative lens and the specific positive lens. The lens group focal length shows the number of the first surface and the focal length of each of the front group G1, the focusing group G2, and the rear group G3.

The unit of each of the focal length f, the radius of curvature r, the inter-surface distance d, and other lengths shown in all the variety of specifications below is typically "mm", but not limited to this, because an optical system provides the same optical performance even when the optical system is proportionally enlarged or reduced. Further, the description of the reference characters and the description of the specification tables hold true for those in the following examples.

TABLE 1

First example

[Overall specifications]

| | |
|---|---|
| f = | 392.0052 |
| FNO = | 2.9000 |
| 2ω = | 6.2675 |
| TL = | 408.0016 |
| BF = | 54.5016 |
| Y = | 21.63 |

[Lens data]

| m | r | d | nd | vd | θgF |
|---|---|---|---|---|---|
| Object plane | ∞ | | | | |
| 1 | 500.0000 | 7.0000 | 1.518600 | 69.89 | |
| 2 | 50155.6390 | 0.3000 | | | |
| 3 | 172.1985 | 12.0000 | 1.433852 | 95.25 | |
| 4 | 559.2575 | 119.0770 | | | |
| 5 | 141.8474 | 11.5000 | 1.433852 | 95.25 | |
| 6 | −457.9970 | 2.1814 | | | |
| 7 | −638.2538 | 3.0000 | 1.683760 | 37.64 | 0.5782 |
| 8 | 269.5417 | 21.6254 | | | |
| 9 | 103.5879 | 8.0000 | 1.663820 | 27.35 | 0.6318 |
| 10 | −5000.0000 | 1.5000 | | | |
| 11 | −571.5429 | 3.0000 | 1.738000 | 32.26 | 0.5899 |
| 12 | 65.7381 | 7.0000 | 1.497820 | 82.57 | |
| 13 | 240.3930 | D1 | | | |
| 14 | 76.6984 | 7.2500 | 1.593490 | 66.99 | |

TABLE 1-continued

First example

| | | | | |
|---|---|---|---|---|
| 15 | 479.2851 | D2 | | |
| 16 | 357.8302 | 4.0000 | 1.953750 | 32.33 |
| 17 | 45.0894 | 7.5433 | | |
| 18 | 0.0000 | 4.3913 | | Aperture stop S |
| 19 | −147.6061 | 5.2382 | 1.902000 | 25.26 |
| 20 | −41.5553 | 1.7000 | 1.743200 | 49.26 |
| 21 | 336.5036 | 2.0000 | | |
| 22 | 152.7003 | 3.3880 | 1.755000 | 52.34 |
| 23 | −1098.6570 | 0.3000 | | |
| 24 | 146.5231 | 5.5000 | 1.640000 | 60.20 |
| 25 | −105.8853 | 1.5000 | 1.846660 | 23.80 |
| 26 | −264.8737 | 2.0000 | | |
| 27 | −269.8582 | 1.7000 | 1.640000 | 60.20 |
| 28 | 199.0203 | 43.8825 | | |
| 29 | 0.0000 | 1.5000 | 1.516800 | 64.14 |
| 30 | 0.0000 | 4.0000 | | |
| 31 | 140.9036 | 11.8663 | 1.784720 | 25.64 |
| 32 | −46.3311 | 1.7000 | 1.945950 | 17.98 |
| 33 | −101.6450 | 1.2000 | | |
| 34 | −391.2744 | 4.1930 | 1.795040 | 28.69 |
| 35 | −97.7638 | 15.2778 | | |
| 36 | −71.8729 | 1.7000 | 2.001000 | 29.12 |
| 37 | 600.0000 | D3 | | |
| Image plane | ∞ | | | |

[Focal length of lens groups]

| Lens group | First surface | Focal length |
|---|---|---|
| Front group | 1 | 299.301 |
| Focusing group | 14 | 152.828 |
| Rear group | 16 | −156.644 |

In the optical system OL1, an on-axis air space D1 between the front group G1 and the focusing group G2, an on-axis air space D2 between the focusing group G2 and the rear group G3, and an on-axis air space D3 (back focus) between the rear group G3 and the image plane change at focusing. Table 2 below shows variable distances at each of an infinite distance image capturing distance, an intermediate image capturing distance, and a close distance image capturing distance. Note that f represents the focal length and β represents the magnification (the description also holds for the following examples).

TABLE 2

[Variable distance data]

| Focusing state | Infinite distance | Intermediate distance | Close distance |
|---|---|---|---|
| f | 392.0052 | — | — |
| β | — | −0.0333 | −0.1682 |
| D1 | 19.5899 | 15.8617 | 2.0899 |
| D2 | 5.8959 | 9.6241 | 23.3959 |
| D3 | 54.5016 | 54.5016 | 54.5016 |

Table 3 below shows values compliant to the conditional expressions in the optical system OL1. In the optical system OL1, the specific negative lens that satisfies Conditional Expressions (12) and (13) is the biconcave negative lens L14 and the biconcave negative lens L16, and the specific positive lens that satisfies Conditional Expressions (14), (15), and (16) is the biconvex positive lens L15. The lens having negative refractive power and disposed closest to the image side is the biconcave negative lens L311.

TABLE 3

[Values compliant to conditional expressions]

fL1 = 973.796
fL2 = 568.156
f1A = 359.105
f1B = 1969.464
f3A = −70.761
f3B = 132.158
fr = −64.039
(1) D23/f1 = 0.398
(2) fL1/f1 = 3.254
(3) νL2 = 95.25
(4) νL3 = 95.25
(5) TL1/fL1 = 0.007
(6) TL2/fL2 = 0.021
(7) f/f1B = 0.199
(8) f1/f1B = 0.152
(9) f1A/f = 0.916
(10) f1A/f1 = 1.200
(11) f1A/f1B = 0.182
(12) θgFn − 0.6558 + 0.01982 × νdn = −0.0047
(13) νdn = 37.64
(14) νdp = 27.35
(15) ndp + 0.01452 × νdp = 2.0536
(16) θgFp + 0.00316 × νdp = 0.71827
(17) f2/f = 0.390
(18) f3/f3A = 2.214
(19) f3/f3B = −1.185
(20) TL/f = 1.041
(21) (−fr)/f = 0.163

As described above, the optical system OL1 satisfies Conditional Expressions (1) to (21) described above.

FIG. 2 shows a spherical aberration diagram, an astigmatism diagram, a distortion diagram, a lateral chromatic aberration diagram, and a coma aberration diagram of the optical system OL1 at focusing upon an infinite distance object and at focusing upon a close distance object. In each aberration diagram, FNO represents the F number, NA represents the numerical aperture, and Y represents the image height. The spherical aberration diagram shows the value of the F number or the numerical aperture corresponding to the maximum aperture, the astigmatism diagram and the distortion diagram each show the maximum value of the image height, and the coma aberration diagram shows the value of each image height. Reference character d represents the d-line (λ=587.6 nm), reference character g represents the g-line (λ=435.8 nm), reference character F represents the F-line (λ=486.1 nm), and reference character C represents the C-line (λ=656.3 nm). In the astigmatism diagram, the solid line represents the sagittal image plane, and the dashed line represents the meridional image plane. Further, in the aberration diagrams in the following examples, the same reference characters as those in the present example are used. The aberration diagrams show that the optical system OL1 allows favorable correction of the variety of aberrations and provides excellent imaging performance.

Second Example

FIG. 3 is a diagram showing the configuration of an optical system OL2 according to a second example. The optical system OL2 includes, sequentially from the object side, a front group G1 having positive refractive power, a focusing group G2 having positive refractive power, and a rear group G3 having negative refractive power. The front group G1 includes, sequentially from the object side, a front-group A group G1A and a front-group B group G1B between which the largest air space on the optical axis in the front group G1 is interposed. The rear group G3 includes, sequentially from the object side, a rear-group A group G3A and a rear-group B group G3B between which the largest air space on the optical axis in the rear group G3 is interposed.

The front-group A group G1A of the front group G1 includes, sequentially from the object side, a biconvex positive lens L11 and a positive meniscus lens L12 having a convex surface facing the object side.

The front-group B group G1B of the front group G1 includes, sequentially from the object side, a biconvex positive lens L13, a biconcave negative lens L14, a biconvex positive lens L15, and a cemented lens formed by cementing a biconcave negative lens L16 and a positive meniscus lens L17 having a convex surface facing the object side.

The focusing group G2 is formed of a biconvex positive lens L21.

The rear-group A group G3A of the rear group G3 includes, sequentially from the object side, a positive meniscus lens L31 having a convex surface facing the object side, a negative meniscus lens L32 having a convex surface facing the object side, a biconcave negative lens L33, a cemented lens formed by cementing a positive meniscus lens L34 having a concave surface facing the object side and a biconcave negative lens L35, and a positive meniscus lens L36 having a convex surface facing the object side.

The rear-group B group G3B of the rear group G3 includes, sequentially from the object side, a biconvex positive lens L37, a cemented lens formed by cementing a negative meniscus lens L38 having a convex surface facing the object side and a biconvex positive lens L39, and a biconcave negative lens L310.

In addition, an aperture stop S is disposed between the negative meniscus lens L32 and the biconcave negative lens L33 in the rear group G3. In addition, a filter FL is disposed between the biconvex positive lens L37 and the cemented lens formed by cementing the negative meniscus lens L38 and the biconvex positive lens L39.

The optical system OL2 is configured to move the focusing group G2 to the object side at focusing upon from an infinite distance object to a close distance object.

Moreover, the optical system OL2 is configured so that image position change due to vibration of the optical system OL2 is corrected by moving an anti-vibration group so as to have a displacement component in the direction perpendicular to the optical axis, the anti-vibration group including the biconcave negative lens L33 and the cemented lens formed by cementing the positive meniscus lens L34 and the biconcave negative lens L35 in the rear-group A group G3A of the rear group G3.

Table 4 below shows values of specifications of the optical system OL2.

TABLE 4

Second example

[Overall specifications]

| | |
|---|---|
| f = | 390.0000 |
| FNO = | 2.9005 |
| 2ω = | 6.3129 |
| TL = | 405.3186 |
| BF = | 53.9996 |
| Y = | 21.63 |

TABLE 4-continued

Second example

[Lens data]

| m | r | d | nd | νd | θgF |
|---|---|---|----|----|-----|
| Object plane | ∞ | | | | |
| 1 | 488.1215 | 8.7000 | 1.518600 | 69.89 | |
| 2 | −1041.4766 | 0.1000 | | | |
| 3 | 198.3557 | 11.0000 | 1.433852 | 95.25 | |
| 4 | 748.0721 | 95.6214 | | | |
| 5 | 139.4073 | 11.5000 | 1.433852 | 95.25 | |
| 6 | −398.2673 | 0.1000 | | | |
| 7 | −416.7878 | 3.0000 | 1.683760 | 37.64 | 0.5782 |
| 8 | 193.0312 | 59.3389 | | | |
| 9 | 151.2115 | 7.0000 | 1.663820 | 27.35 | 0.6319 |
| 10 | −207.8119 | 0.1000 | | | |
| 11 | −213.0278 | 1.8000 | 1.749504 | 35.33 | |
| 12 | 53.8659 | 8.5000 | 1.497820 | 82.57 | 0.5386 |
| 13 | 461.5207 | D1 | | | |
| 14 | 73.7387 | 6.2000 | 1.618000 | 63.34 | |
| 15 | −4051.4628 | D2 | | | |
| 16 | 59.7259 | 4.4000 | 1.717360 | 29.57 | |
| 17 | 90.4676 | 0.9409 | | | |
| 18 | 157.9242 | 1.8000 | 1.902650 | 35.77 | |
| 19 | 42.9276 | 6.1064 | | | |
| 20 | 0.0000 | 7.3677 | | | Aperture stop S |
| 21 | −167.1137 | 1.8000 | 1.910822 | 35.25 | |
| 22 | 128.2270 | 3.2883 | | | |
| 23 | −87.1091 | 4.1000 | 1.846663 | 23.78 | |
| 24 | −40.4123 | 1.8000 | 1.497820 | 82.57 | |
| 25 | 196.5860 | 4.6000 | | | |
| 26 | 79.1062 | 3.8000 | 1.654115 | 39.68 | |
| 27 | 892.4512 | 37.2721 | | | |
| 28 | 62.0976 | 5.5000 | 1.696800 | 55.52 | |
| 29 | −569.2364 | 10.0000 | | | |
| 30 | 0.0000 | 1.5000 | 1.516800 | 63.88 | |
| 31 | 0.0000 | 0.1000 | | | |
| 32 | 71.5905 | 1.5000 | 1.804000 | 46.60 | |
| 33 | 30.4774 | 8.8000 | 1.612660 | 44.46 | |
| 34 | −122.5264 | 5.1181 | | | |
| 35 | −66.8928 | 1.5000 | 2.000694 | 25.46 | |
| 36 | 201.5820 | D3 | | | |
| Image plane | ∞ | | | | |

[Focal length of lens groups]

| Lens group | First surface | Focal length |
|---|---|---|
| Front group | 1 | 467.387 |
| Focusing group | 14 | 117.253 |
| Rear group | 16 | −169.127 |

In the optical system OL2, an on-axis air space D1 between the front group G1 and the focusing group G2, an on-axis air space D2 between the focusing group G2 and the rear group G3, and an on-axis air space D3 (back focus) between the rear group G3 and the image plane change at focusing. Table 5 below shows variable distances at each of an infinite distance image capturing distance, an intermediate image capturing distance, and a close distance image capturing distance.

TABLE 5

[Variable distance data]

| Focusing state | Infinite distance | Intermediate distance | Close distance |
|---|---|---|---|
| f | 390.0000 | — | — |
| β | — | −0.0333 | −0.1716 |
| D1 | 22.9652 | 19.2370 | 4.8345 |

TABLE 5-continued

[Variable distance data]

| Focusing state | Infinite distance | Intermediate distance | Close distance |
|---|---|---|---|
| D2 | 4.1000 | 7.8282 | 22.2307 |
| D3 | 53.9996 | 53.9996 | 53.9996 |

Table 6 below shows values compliant to the conditional expressions in the optical system OL2. In the optical system OL2, the specific negative lens that satisfies Conditional Expressions (12) and (13) is the biconcave negative lens L14 and the positive meniscus lens L17, and the specific positive lens that satisfies Conditional Expressions (14), (15), and (16) is the biconvex positive lens L15. The lens having negative refractive power and disposed closest to the image side is the biconcave negative lens L310.

TABLE 6

[Values compliant to conditional expressions]

fL1 = 642.114
fL2 = 618.424
f1A = 315.337
f1B = −1161.827
f3A = −57.891
f3B = 125.036
fr = −50.051
(1) D23/f1 = 0.205
(2) fL1/f1 = 1.374
(3) νL2 = 95.25
(4) νL3 = 95.25
(5) TL1/fL1 = 0.014
(6) TL2/fL2 = 0.018
(7) f/f1B = −0.336
(8) f1/f1B = −0.402
(9) f1A/f = 0.809
(10) f1A/f1 = 0.675
(11) f1A/f1B = −0.271
(12) θgFn − 0.6558 + 0.01982 × νdn = −0.0047
(13) νdn = 37.64
(14) νdp = 27.35
(15) ndp + 0.01452 × νdp = 2.0536
(16) θgFp + 0.00316 × νdp = 0.71830
(17) f2/f = 0.301
(18) f3/f3A = 2.921
(19) f3/f3B = −1.353
(20) TL/f = 1.039
(21) (−fr)/f = 0.128

As described above, the optical system OL2 satisfies Conditional Expressions (1) to (21) described above.

FIG. 4 shows a spherical aberration diagram, an astigmatism diagram, a distortion diagram, a lateral chromatic aberration diagram, and a coma aberration diagram of the optical system OL2 at focusing upon an infinite distance object and at focusing upon a close distance object. The aberration diagrams show that the optical system OL2 allows favorable correction of the variety of aberrations and provides excellent imaging performance.

Third Example

FIG. 5 is a diagram showing the configuration of an optical system OL3 according to a third example. The optical system OL3 includes, sequentially from the object side, a front group G1 having positive refractive power, a focusing group G2 having positive refractive power, and a rear group G3 having negative refractive power. The front group G1 includes, sequentially from the object side, a front-group A group G1A and a front-group B group G1B between which the largest air space on the optical axis in the front group G1 is interposed. The rear group G3 includes, sequentially from the object side, a rear-group A group G3A and a rear-group B group G3B between which the largest air space on the optical axis in the rear group G3 is interposed.

The front-group A group G1A of the front group G1 includes, sequentially from the object side, a biconvex positive lens L11 and a positive meniscus lens L12 having a convex surface facing the object side.

The front-group B group G1B of the front group G1 includes, sequentially from the object side, a positive meniscus lens L13 having a convex surface facing the object side, a positive meniscus lens L14 having a convex surface facing the object side, and a cemented lens formed by cementing a negative meniscus lens L15 having a convex surface facing the object side and a positive meniscus lens L16 having a convex surface facing the object side.

The focusing group G2 is formed of a positive meniscus lens L21 having a convex surface facing the object side.

The rear-group A group G3A of the rear group G3 includes, sequentially from the object side, a cemented lens formed by cementing a biconcave negative lens L31 and a negative meniscus lens L32 having a convex surface facing the object side, a cemented lens formed by cementing a biconvex positive lens L33 and a biconcave negative lens L34, a negative meniscus lens L35 having a concave surface facing the object side, and a positive meniscus lens L36 having a convex surface facing the object side.

The rear-group B group G3B of the rear group G3 includes, sequentially from the object side, a biconvex positive lens L37, a cemented lens formed by cementing a negative meniscus lens L38 having a convex surface facing the object side and a biconvex positive lens L39, and a biconcave negative lens L310.

In addition, an aperture stop S is disposed between the cemented lens formed by cementing the biconcave negative lens L31 and the negative meniscus lens L32 and the cemented lens formed by cementing the biconvex positive lens L33 and the biconcave negative lens L34 in the rear group G3. In addition, a filter FL is disposed between the biconvex positive lens L37 and the cemented lens formed by cementing the negative meniscus lens L38 and the biconvex positive lens L39.

The optical system OL3 is configured to move the focusing group G2 to the object side at focusing upon from an infinite distance object to a close distance object.

Moreover, the optical system OL3 is configured so that image position change due to vibration of the optical system OL3 is corrected by moving an anti-vibration group so as to have a displacement component in the direction perpendicular to the optical axis, the anti-vibration group including the cemented lens formed by cementing the biconvex positive lens L33 and the biconcave negative lens L34 and the negative meniscus lens L35 in the rear-group A group G3A of the rear group G3.

Table 7 below shows values of specifications of the optical system OL3.

TABLE 7

Third example

[Overall specifications]

| | |
|---|---|
| f = | 298.3953 |
| FNO = | 2.9000 |
| 2ω = | 8.2440 |

TABLE 7-continued

Third example

| | |
|---|---|
| TL = | 313.0012 |
| BF = | 54.5012 |
| Y = | 21.63 |

[Lens data]

| m | r | d | nd | νd | θgF |
|---|---|---|---|---|---|
| Object plane | ∞ | | | | |
| 1 | 444.6622 | 5.8000 | 1.518600 | 69.89 | |
| 2 | −1805.3921 | 0.3000 | | | |
| 3 | 118.6028 | 10.8000 | 1.433852 | 95.25 | |
| 4 | 266.7981 | 56.0000 | | | |
| 5 | 103.1499 | 10.0000 | 1.433852 | 95.25 | |
| 6 | 5183.3946 | 1.5214 | | | |
| 7 | 106.1505 | 6.5000 | 1.663820 | 27.35 | 0.6318 |
| 8 | 190.2018 | 6.5352 | | | |
| 9 | 1830.9853 | 2.4000 | 1.749505 | 35.33 | 0.5818 |
| 10 | 49.1468 | 7.2000 | 1.497820 | 82.57 | |
| 11 | 102.2136 | D1 | | | |
| 12 | 76.9272 | 5.7000 | 1.593490 | 66.99 | |
| 13 | 1556.3561 | D2 | | | |
| 14 | −18858.3390 | 2.0000 | 1.487490 | 70.31 | |
| 15 | 108.9124 | 4.0000 | 1.903660 | 31.27 | |
| 16 | 67.1620 | 7.0780 | | | |
| 17 | 0.0000 | 2.9427 | | | Aperture stop S |
| 18 | 3164.6712 | 4.4048 | 1.846660 | 23.80 | |
| 19 | −80.2517 | 1.7000 | 1.673000 | 38.15 | |
| 20 | 80.2854 | 4.8902 | | | |
| 21 | −82.7984 | 1.7000 | 1.744000 | 44.81 | |
| 22 | −141.1755 | 3.0000 | | | |
| 23 | 98.5101 | 2.4324 | 1.664460 | 35.87 | |
| 24 | 182.7877 | 42.0611 | | | |
| 25 | 97.7414 | 6.5000 | 1.729160 | 54.61 | |
| 26 | −177.4418 | 4.7096 | | | |
| 27 | 0.0000 | 1.5000 | 1.516800 | 64.14 | |
| 28 | 0.0000 | 8.9266 | | | |
| 29 | 118.9502 | 2.4000 | 1.720000 | 43.61 | |
| 30 | 32.2853 | 9.9123 | 1.673000 | 38.15 | |
| 31 | −907.3884 | 3.5000 | | | |
| 32 | −99.6180 | 1.7000 | 2.001000 | 29.12 | |
| 33 | 400.0000 | D3 | | | |
| Image plane | ∞ | | | | |

[Focal length of lens groups]

| Lens group | First surface | Focal length |
|---|---|---|
| Front group | 1 | 306.697 |
| Focusing group | 12 | 136.163 |
| Rear group | 14 | −197.284 |

In the optical system OL3, an on-axis air space D1 between the front group G1 and the focusing group G2, an on-axis air space D2 between the focusing group G2 and the rear group G3, and an on-axis air space D3 (back focus) between the rear group G3 and the image plane change at focusing. Table 8 below shows variable distances at each of an infinite distance image capturing distance, an intermediate image capturing distance, and a close distance image capturing distance.

TABLE 8

[Variable distance data]

| Focusing state | Infinite distance | Intermediate distance | Close distance |
|---|---|---|---|
| f | 298.3953 | — | — |
| β | — | −0.0333 | −0.1761 |
| D1 | 26.5599 | 23.4033 | 10.7689 |

TABLE 8-continued

[Variable distance data]

| Focusing state | Infinite distance | Intermediate distance | Close distance |
|---|---|---|---|
| D2 | 3.8258 | 6.9825 | 19.6169 |
| D3 | 54.5012 | 54.5013 | 54.5017 |

Table 9 below shows values compliant to the conditional expressions in the optical system OL3. In the optical system OL3, the specific negative lens that satisfies Conditional Expressions (12) and (13) is the negative meniscus lens L15, and the specific positive lens that satisfies Conditional Expressions (14), (15), and (16) is the positive meniscus lens L14. The lens having negative refractive power and disposed closest to the image side is the biconcave negative lens L310.

TABLE 9

[Values compliant to conditional expressions]

$fL1 = 688.587$
$fL2 = 481.536$
$f1A = 282.760$
$f1B = 242.437$
$f3A = -60.249$
$f3B = 129.424$
$fr = -79.540$
(1) $D23/f1 = 0.183$
(2) $fL1/f1 = 2.245$
(3) $vL2 = 95.25$
(4) $vL3 = 95.25$
(5) $TL1/fL1 = 0.008$
(6) $TL2/fL2 = 0.022$
(7) $f/f1B = 1.231$
(8) $f1/f1B = 1.265$
(9) $f1A/f = 0.948$
(10) $f1A/f1 = 0.922$
(11) $f1A/f1B = 1.166$
(12) $\theta gFn - 0.6558 + 0.01982 \times vdn = -0.0064$
(13) $vdn = 35.33$
(14) $vdp = 27.35$
(15) $ndp + 0.01452 \times vdp = 2.0536$
(16) $\theta gFp + 0.00316 \times vdp = 0.71827$
(17) $f2/f = 0.456$
(18) $f3/f3A = 3.274$
(19) $f3/f3B = -1.524$
(20) $TL/f = 1.049$
(21) $(-fr)/f = 0.267$ As described above, the optical system OL3 satisfies Conditional Expressions (1) to (21) described above.

FIG. 6 shows a spherical aberration diagram, an astigmatism diagram, a distortion diagram, a lateral chromatic aberration diagram, and a coma aberration diagram of the optical system OL3 at focusing upon an infinite distance object and at focusing upon a close distance object. The aberration diagrams show that the optical system OL3 allows favorable correction of the variety of aberrations and provides excellent imaging performance.

Fourth Example

FIG. 7 is a diagram showing the configuration of an optical system OL4 according to a fourth example. The optical system OL4 includes, sequentially from the object side, a front group G1 having positive refractive power, a focusing group G2 having positive refractive power, and a rear group G3 having negative refractive power. The front group G1 includes, sequentially from the object side, a front-group A group G1A and a front-group B group G1B between which the largest air space on the optical axis in the front group G1 is interposed. The rear group G3 includes, sequentially from the object side, a rear-group A group G3A and a rear-group B group G3B between which the largest air space on the optical axis in the rear group G3 is interposed.

The front-group A group G1A of the front group G1 includes, sequentially from the object side, a biconvex positive lens L11 and a positive meniscus lens L12 having a convex surface facing the object side.

The front-group B group G1B of the front group G1 includes, sequentially from the object side, a biconvex positive lens L13, a biconcave negative lens L14, a biconvex positive lens L15, and a cemented lens formed by cementing a biconcave negative lens L16 and a positive meniscus lens L17 having a convex surface facing the object side.

The focusing group G2 is formed of a positive meniscus lens L21 having a convex surface facing the object side.

The rear-group A group G3A of the rear group G3 includes, sequentially from the object side, a cemented lens formed by cementing a positive meniscus lens L31 having a convex surface facing the object side and a negative meniscus lens L32 having a convex surface facing the object side, a biconcave negative lens L33, a cemented lens formed by cementing a positive meniscus lens L34 having a concave surface facing the object side and a biconcave negative lens L35, and a positive meniscus lens L36 having a convex surface facing the object side.

The rear-group B group G3B of the rear group G3 includes, sequentially from the object side, a biconvex positive lens L37, and a cemented lens formed by cementing a biconcave negative lens L38, a biconvex positive lens L39, and a negative meniscus lens L310 having a concave surface facing the object side.

In addition, an aperture stop S is disposed between the cemented lens formed by cementing the positive meniscus lens L31 and the negative meniscus lens L32 and the biconcave negative lens L33 in the rear group G3. In addition, a filter FL is disposed between the biconvex positive lens L37 and the cemented lens formed by cementing the biconcave negative lens L38, the biconvex positive lens L39, and the negative meniscus lens L310.

The optical system OL4 is configured to move the focusing group G2 to the object side at focusing upon from an infinite distance object to a close distance object.

Moreover, the optical system OL4 is configured so that image position change due to vibration of the optical system OL4 is corrected by moving an anti-vibration group so as to have a displacement component in the direction perpendicular to the optical axis, the anti-vibration group including the biconcave negative lens L33 and the cemented lens formed by cementing the positive meniscus lens L34 and the biconcave negative lens L35 in the rear-group A group G3A of the rear group G3.

Table 10 below shows values of specifications of the optical system OL4.

TABLE 10

Fourth example

[Overall specifications]

| | |
|---|---|
| $f =$ | 489.9988 |
| $FNO =$ | 4.1206 |
| $2\omega =$ | 4.9946 |

TABLE 10-continued

Fourth example

TL = 405.3183
BF = 49.8394
Y 21.63

[Lens data]

| m | r | d | nd | νd | θgF |
|---|---|---|---|---|---|
| Object plane | ∞ | | | | |
| 1 | 605.7714 | 7.7000 | 1.518600 | 69.89 | |
| 2 | −1237.2872 | 0.1000 | | | |
| 3 | 174.2647 | 11.0000 | 1.433852 | 95.25 | |
| 4 | 1248.1242 | 90.0000 | | | |
| 5 | 139.4073 | 9.5000 | 1.433852 | 95.25 | |
| 6 | −394.6806 | 0.1000 | | | |
| 7 | −416.7878 | 3.0000 | 1.683760 | 37.64 | 0.5782 |
| 8 | 311.9273 | 38.0387 | | | |
| 9 | 264.0151 | 5.5000 | 1.663820 | 27.35 | 0.6319 |
| 10 | −220.4922 | 0.1000 | | | |
| 11 | −227.6958 | 1.8000 | 1.749504 | 35.33 | 0.5819 |
| 12 | 61.1365 | 7.0000 | 1.497820 | 82.57 | |
| 13 | 347.8815 | D1 | | | |
| 14 | 88.5914 | 4.7000 | 1.618000 | 63.34 | |
| 15 | 2512.1476 | D2 | | | |
| 16 | 55.3644 | 3.4000 | 1.717360 | 29.57 | |
| 17 | 486.2738 | 1.8000 | 1.902650 | 35.77 | |
| 18 | 40.1605 | 4.5377 | | | |
| 19 | 0.0000 | 7.1393 | | | Aperture stop S |
| 20 | −128.7433 | 1.8000 | 1.910822 | 35.25 | |
| 21 | 138.3499 | 1.7366 | | | |
| 22 | −99.4862 | 3.6000 | 1.846663 | 23.78 | |
| 23 | −40.3762 | 1.8000 | 1.497820 | 82.57 | |
| 24 | 210.1593 | 4.6000 | | | |
| 25 | 95.7887 | 2.8000 | 1.654115 | 39.68 | |
| 26 | 940.3466 | 47.9268 | | | |
| 27 | 60.3348 | 6.5000 | 1.772500 | 49.62 | |
| 28 | −164.6556 | 12.4211 | | | |
| 29 | 0.0000 | 1.5000 | 1.516800 | 63.88 | |
| 30 | 0.0000 | 1.5214 | | | |
| 31 | −554.1343 | 1.5000 | 1.729160 | 54.61 | |
| 32 | 26.9921 | 9.8000 | 1.612660 | 44.46 | |
| 33 | −33.4928 | 1.5000 | 2.000694 | 25.46 | |
| 34 | −1558.9711 | D3 | | | |
| Image plane | ∞ | | | | |

[Focal length of lens groups]

| Lens group | First surface | Focal length |
|---|---|---|
| Front group | 1 | 420.065 |
| Focusing group | 14 | 148.482 |
| Rear group | 16 | −118.353 |

In the optical system OL4, an on-axis air space D1 between the front group G1 and the focusing group G2, an on-axis air space D2 between the focusing group G2 and the rear group G3, and an on-axis air space D3 (back focus) between the rear group G3 and the image plane change at focusing. Table 11 below shows variable distances at each of an infinite distance image capturing distance, an intermediate image capturing distance, and a close distance image capturing distance.

TABLE 11

[Variable distance data]

| Focusing state | Infinite distance | Intermediate distance | Close distance |
|---|---|---|---|
| f | 489.9988 | — | — |
| β | — | −0.0333 | −0.1485 |
| D1 | 55.7987 | 50.9724 | 35.7987 |
| D2 | 5.2588 | 10.0851 | 25.2588 |
| D3 | 49.8394 | 49.8394 | 49.8394 |

Table 12 below shows values compliant to the conditional expressions in the optical system OL4. In the optical system OL4, the specific negative lens that satisfies Conditional Expressions (12) and (13) is the biconcave negative lens L14 and the biconcave negative lens L16, and the specific positive lens that satisfies Conditional Expressions (14), (15), and (16) is the biconvex positive lens L15. The lens having negative refractive power and disposed closest to the image side is the negative meniscus lens L310.

TABLE 12

[Values compliant to conditional expressions]

fL1 = 785.286
fL2 = 465.409
f1A = 292.751
f1B = 238.738
f3A = −59.029
f3B = 145.793
fr = −34.221
(1) D23/f1 = 0.214
(2) fL1/f1 = 1.869
(3) νL2 = 95.25
(4) νL3 = 95.25
(5) TL1/fL1 = 0.010
(6) TL2/fL2 = 0.024
(7) f/f1B = 2.052
(8) f1/f1B = 1.760
(9) f1A/f = 0.597
(10) f1A/f1 = 0.697
(11) f1A/f1B = 1.166
(12) θgFn − 0.6558 + 0.01982 × νdn = −0.0047
(13) νdn = 37.64
(14) νdp = 27.35
(15) ndp + 0.01452 × νdp = 2.0536
(16) θgFp + 0.00316 × νdp = 0.71830
(17) f2/f = 0.303
(18) f3/f3A = 2.005
(19) f3/f3B = −0.812
(20) TL/f = 0.827
(21) (−fr)/f = 0.070

As described above, the optical system OL4 satisfies Conditional Expressions (1) to (21) described above.

FIG. 8 shows a spherical aberration diagram, an astigmatism diagram, a distortion diagram, a lateral chromatic aberration diagram, and a coma aberration diagram of the optical system OL4 at focusing upon an infinite distance object and at focusing upon a close distance object. The aberration diagrams show that the optical system OL4 allows favorable correction of the variety of aberrations and provides excellent imaging performance.

Fifth Example

FIG. 9 is a diagram showing the configuration of an optical system OL5 according to a fifth example. The optical system OL5 includes, sequentially from the object side, a front group G1 having positive refractive power, a focusing group G2 having positive refractive power, and a rear group G3 having negative refractive power. The front group G1 includes, sequentially from the object side, a front-group A group G1A and a front-group B group G1B between which the largest air space on the optical axis in the front group G1 is interposed. The rear group G3 includes, sequentially from the object side, a rear-group A group G3A and a rear-group B group G3B between which the largest air space on the optical axis in the rear group G3 is interposed.

The front-group A group G1A of the front group G1 includes, sequentially from the object side, a positive meniscus lens L11 having a convex surface facing the object side and a positive meniscus lens L12 having a convex surface facing the object side.

The front-group B group G1B of the front group G1 includes, sequentially from the object side, a biconvex positive lens L13, a biconcave negative lens L14, a positive meniscus lens L15 having a convex surface facing the object side, and a cemented lens formed by cementing a negative meniscus lens L16 having a convex surface facing the object side and a positive meniscus lens L17 having a convex surface facing the object side.

The focusing group G2 is formed of a positive meniscus lens L21 having a convex surface facing the object side.

The rear-group A group G3A of the rear group G3 includes, sequentially from the object side, a cemented lens formed by cementing a biconvex positive lens L31 and a biconcave negative lens L32, a cemented lens formed by cementing a positive meniscus lens L33 having a concave surface facing the object side and a biconcave negative lens L34, a biconcave negative lens L35, and a positive meniscus lens L36 having a convex surface facing the object side.

The rear-group B group G3B of the rear group G3 includes, sequentially from the object side, a cemented lens formed by cementing a biconvex positive lens L37 and a negative meniscus lens L38 having a concave surface facing the object side, a cemented lens formed by cementing a negative meniscus lens L39 having a convex surface facing the object side and a biconvex positive lens L310, and a biconcave negative lens L311.

In addition, an aperture stop S is disposed between the cemented lens formed by cementing the biconvex positive lens L31 and the biconcave negative lens L32 and the cemented lens formed by cementing the positive meniscus lens L33 and the biconcave negative lens L34 in the rear group G3. In addition, a filter FL is disposed between the cemented lens formed by cementing the biconvex positive lens L37 and the negative meniscus lens L38 and the cemented lens formed by cementing the negative meniscus lens L39 having a convex surface facing the object side and the biconvex positive lens L310.

The optical system OL5 is configured to move the focusing group G2 to the object side at focusing upon from an infinite distance object to a close distance object.

Moreover, the optical system OL5 is configured so that image position change due to vibration of the optical system OL5 is corrected by moving an anti-vibration group so as to have a displacement component in the direction perpendicular to the optical axis, the anti-vibration group including the cemented lens formed by cementing the positive meniscus lens L33 and the biconcave negative lens L34 and the biconcave negative lens L35 in the rear-group A group G3A of the rear group G3.

Table 13 below shows values of specifications of the optical system OL5.

TABLE 13

Fifth example

[Overall specifications]

| | |
|---|---|
| f = | 588.0074 |
| FNO = | 4.1166 |
| 2ω = | 4.1855 |
| TL = | 469.6613 |
| BF = | 69.9789 |
| Y = | 21.63 |

[Lens data]

| m | r | d | nd | νd | θgF |
|---|---|---|---|---|---|
| Object plane | ∞ | | | | |
| 1 | 421.5344 | 9.5000 | 1.518600 | 69.89 | |
| 2 | 2273.4202 | 10.0000 | | | |
| 3 | 219.9159 | 12.5000 | 1.433852 | 95.25 | |
| 4 | 1465.6544 | 112.6586 | | | |
| 5 | 163.3272 | 11.5000 | 1.433852 | 95.25 | |
| 6 | −838.0975 | 1.2000 | | | |
| 7 | −821.7653 | 2.8000 | 1.738000 | 32.26 | 0.5899 |
| 8 | 356.0157 | 20.0000 | | | |
| 9 | 106.9038 | 8.5000 | 1.663820 | 27.35 | 0.6318 |
| 10 | 394.1116 | 0.3000 | | | |
| 11 | 359.0766 | 2.0667 | 1.738000 | 32.26 | 0.5899 |
| 12 | 66.1994 | 7.2000 | 1.497820 | 82.57 | |
| 13 | 116.1691 | D1 | | | |
| 14 | 101.0494 | 7.0439 | 1.593490 | 66.99 | |
| 15 | 529.3900 | D2 | | | |
| 16 | 213.4123 | 5.7514 | 1.698950 | 30.13 | |
| 17 | −792.7220 | 3.3197 | 1.883000 | 40.66 | |
| 18 | 81.1324 | 24.7327 | | | |
| 19 | 0.0000 | 2.8640 | | | Aperture stop S |
| 20 | −610.2519 | 3.0896 | 1.795040 | 28.69 | |
| 21 | −102.5924 | 1.7000 | 1.640000 | 60.20 | |
| 22 | 103.0186 | 2.7072 | | | |
| 23 | −377.8312 | 1.8000 | 1.755000 | 52.34 | |
| 24 | 625.3973 | 3.4765 | | | |
| 25 | 117.2113 | 2.1894 | 1.672700 | 32.19 | |
| 26 | 205.1647 | 43.6025 | | | |
| 27 | 92.0719 | 4.6883 | 1.677900 | 50.67 | |
| 28 | −266.4131 | 1.7000 | 1.834810 | 42.73 | |
| 29 | −358.3293 | 16.4849 | | | |
| 30 | 0.0000 | 1.5000 | 1.516800 | 64.14 | |
| 31 | 0.0000 | 9.9184 | | | |
| 32 | 395.0122 | 1.7000 | 1.720000 | 43.61 | |
| 33 | 36.0213 | 10.1507 | 1.720467 | 34.71 | |
| 34 | −53.5346 | 1.0000 | | | |
| 35 | −51.1252 | 1.7000 | 2.001000 | 29.12 | |
| 36 | 400.0000 | D3 | | | |
| Image plane | ∞ | | | | |

[Focal length of lens groups]

| Lens group | First surface | Focal length |
|---|---|---|
| Front group | 1 | 386.723 |
| Focusing group | 14 | 209.149 |
| Rear group | 16 | −106.186 |

In the optical system OL5, an on-axis air space D1 between the front group G1 and the focusing group G2, an on-axis air space D2 between the focusing group G2 and the rear group G3, and an on-axis air space D3 (back focus) between the rear group G3 and the image plane change at focusing. Table 14 below shows variable distances at each of an infinite distance image capturing distance, an intermediate image capturing distance, and a close distance image capturing distance.

TABLE 14

[Variable distance data]

| Focusing state | Infinite distance | Intermediate distance | Close distance |
|---|---|---|---|
| f | 588.0074 | — | — |
| β | — | −0.0333 | −0.1478 |
| D1 | 46.9380 | 42.3876 | 27.9380 |
| D2 | 3.4000 | 7.9505 | 22.4000 |
| D3 | 69.9789 | 69.9790 | 69.9795 |

Table 15 below shows values compliant to the conditional expressions in the optical system OL5. In the optical system OL5, the specific negative lens that satisfies Conditional Expressions (12) and (13) is the biconcave negative lens L14 and the negative meniscus lens L16, and the specific positive lens that satisfies Conditional Expressions (14), (15), and (16) is the positive meniscus lens L15. The lens having negative refractive power and disposed closest to the image side is the biconcave negative lens L311.

TABLE 15

[Values compliant to conditional expressions]

fL1 = 996.107
fL2 = 594.570
f1A = 376.144
f1B = 3647.321
f3A = −63.465
f3B = 192.862
fr = −45.201
(1) D23/f1 = 0.291
(2) fL1/f1 = 2.576
(3) νL2 = 95.25
(4) νL3 = 95.25
(5) TL1/fL1 = 0.010
(6) TL2/fL2 = 0.021
(7) f/f1B = 0.161
(8) f1/f1B = 0.106
(9) f1A/f = 0.640
(10) f1A/f1 = 0.973
(11) f1A/f1B = 0.103
(12) θgFn − 0.6558 + 0.01982 × νdn = −0.0053
(13) νdn = 32.26
(14) νdp = 27.35
(15) ndp + 0.01452 × νdp = 2.0536
(16) θgFp + 0.00316 × νdp = 0.71827
(17) f2/f = 0.356
(18) f3/f3A = 1.673
(19) f3/f3B = −0.551
(20) TL/f = 0.799
(21) (−fr)/f = 0.077

As described above, the optical system OL5 satisfies Conditional Expressions (1) to (21) described above.

FIG. 10 shows a spherical aberration diagram, an astigmatism diagram, a distortion diagram, a lateral chromatic aberration diagram, and a coma aberration diagram of the optical system OL5 at focusing upon an infinite distance object and at focusing upon a close distance object. The aberration diagrams show that the optical system OL5 allows favorable correction of the variety of aberrations and provides excellent imaging performance.

Sixth Example

FIG. 11 is a diagram showing the configuration of an optical system OL6 according to a sixth example. The optical system OL6 includes, sequentially from the object side, a front group G1 having positive refractive power, a focusing group G2 having negative refractive power, and a rear group G3 having positive refractive power. The front group G1 includes, sequentially from the object side, a front-group A group G1A and a front-group B group G1B between which the largest air space on the optical axis in the front group G1 is interposed. The rear group G3 includes, sequentially from the object side, a rear-group A group G3A and a rear-group B group G3B between which the largest air space on the optical axis in the rear group G3 is interposed.

The front-group A group G1A of the front group G1 includes, sequentially from the object side, a positive meniscus lens L11 having a convex surface facing the object side and a positive meniscus lens L12 having a convex surface facing the object side.

The front-group B group G1B of the front group G1 includes, sequentially from the object side, a biconvex positive lens L13, a biconcave negative lens L14, a biconvex positive lens L15, a cemented lens formed by cementing a biconcave negative lens L16 and a biconvex positive lens L17, and a positive meniscus lens L18 having a convex surface facing the object side.

The focusing group G2 is formed of a cemented lens formed by cementing a biconvex positive lens L21 and a biconcave negative lens L22 sequentially from the object side.

The rear-group A group G3A of the rear group G3 includes, sequentially from the object side, a biconcave negative lens L31, a cemented lens formed by cementing a positive meniscus lens L32 having a concave surface facing the object side and a biconcave negative lens L33, and a positive meniscus lens L34 having a convex surface facing the object side.

The rear-group B group G3B of the rear group G3 includes, sequentially from the object side, a biconvex positive lens L35, a cemented lens formed by cementing a negative meniscus lens L36 having a convex surface facing the object side and a biconvex positive lens L37, and a biconcave negative lens L38.

In addition, an aperture stop S is disposed between the focusing group G2 and the rear group G3. In addition, a filter FL is disposed between the biconvex positive lens L35 and the cemented lens formed by cementing the negative meniscus lens L36 having a convex surface facing the object side and the biconvex positive lens L37.

The optical system OL6 is configured to move the focusing group G2 to the image side at focusing upon from an infinite distance object to a close distance object.

Moreover, the optical system OL6 is configured so that image position change due to vibration of the optical system OL6 is corrected by moving an anti-vibration group so as to have a displacement component in the direction perpendicular to the optical axis, the anti-vibration group including the biconcave negative lens L31 and the cemented lens formed by cementing the positive meniscus lens L32 having a concave surface facing the object side and the biconcave negative lens L33 in the rear-group A group G3A of the rear group G3.

Table 16 below shows values of specifications of the optical system OL6.

TABLE 16

| Sixth example |  |
|---|---|
| [Overall specifications] | |
| f = | 389.9999 |
| FNO = | 2.9005 |

TABLE 16-continued

Sixth example

| | | | | | |
|---|---|---|---|---|---|
| 2ω = | | 6.3010 | | | |
| TL = | | 405.3185 | | | |
| BF = | | 53.9997 | | | |
| Y = | | 21.60 | | | |

[Lens data]

| m | r | d | nd | νd | θgF |
|---|---|---|---|---|---|
| Object plane | ∞ | | | | |
| 1 | 414.8764 | 8.7000 | 1.518600 | 69.89 | |
| 2 | 102533.8900 | 0.1000 | | | |
| 3 | 217.0950 | 12.0000 | 1.433852 | 95.25 | |
| 4 | 1386.6916 | 104.7213 | | | |
| 5 | 139.4073 | 11.5000 | 1.433852 | 95.25 | |
| 6 | −424.7939 | 1.8871 | | | |
| 7 | −416.7878 | 3.0000 | 1.683760 | 37.64 | 0.5782 |
| 8 | 218.3903 | 60.0262 | | | |
| 9 | 95.8113 | 6.6000 | 1.663820 | 27.35 | 0.6319 |
| 10 | −2146.8008 | 0.1000 | | | |
| 11 | −1472.0872 | 1.8000 | 1.737999 | 32.26 | 0.5899 |
| 12 | 53.2664 | 8.8000 | 1.497820 | 82.57 | |
| 13 | −1111.1147 | 0.2000 | | | |
| 14 | 66.4966 | 6.5000 | 1.497820 | 82.57 | |
| 15 | 592.8450 | D1 | | | |
| 16 | 659.6101 | 3.5000 | 1.755750 | 24.71 | |
| 17 | −8880.2436 | 1.8000 | 1.804000 | 46.60 | |
| 18 | 50.2599 | D2 | | | |
| 19 | 0.0000 | 7.5210 | | | Aperture stop S |
| 20 | −203.9986 | 1.8000 | 1.910822 | 35.25 | |
| 21 | 133.9496 | 3.3656 | | | |
| 22 | −83.0862 | 4.1000 | 1.846663 | 23.78 | |
| 23 | −41.3019 | 1.8000 | 1.497820 | 82.57 | |
| 24 | 219.2608 | 4.6000 | | | |
| 25 | 72.9679 | 3.8000 | 1.654115 | 39.68 | |
| 26 | 730.7596 | 37.1979 | | | |
| 27 | 58.5088 | 5.5000 | 1.696800 | 55.52 | |
| 28 | −497.4874 | 10.0000 | | | |
| 29 | 0.0000 | 1.5000 | 1.516800 | 63.88 | |
| 30 | 0.0000 | 0.1000 | | | |
| 31 | 66.4007 | 1.5000 | 1.804000 | 46.60 | |
| 32 | 27.7295 | 8.8000 | 1.612660 | 44.46 | |
| 33 | −249.5278 | 4.0868 | | | |
| 34 | −68.1638 | 1.5000 | 2.000694 | 25.46 | |
| 35 | 245.2521 | D3 | | | |
| Image plane | ∞ | | | | |

[Focal length of lens groups]

| Lens group | First surface | Focal length |
|---|---|---|
| Front group | 1 | 151.758 |
| Focusing group | 16 | −67.559 |
| Rear group | 20 | 306.385 |

In the optical system OL6, an on-axis air space D1 between the front group G1 and the focusing group G2, an on-axis air space D2 between the focusing group G2 and the rear group G3, and an on-axis air space D3 (back focus) between the rear group G3 and the image plane change at focusing. Table 17 below shows variable distances at each of an infinite distance image capturing distance, an intermediate image capturing distance, and a close distance image capturing distance.

TABLE 17

[Variable distance data]

| Focusing state | Infinite distance | Intermediate distance | Close distance |
|---|---|---|---|
| f | 389.9999 | — | — |
| β | — | −0.0333 | −0.1673 |
| D1 | 4.5084 | 6.7244 | 16.2327 |
| D2 | 18.7153 | 16.4993 | 6.9910 |
| D3 | 53.9997 | 53.9997 | 53.9997 |

Table 18 below shows values compliant to the conditional expressions in the optical system OL6. In the optical system OL6, the specific negative lens that satisfies Conditional Expressions (12) and (13) is the biconcave negative lens L14 and the biconcave negative lens L16, and the specific positive lens that satisfies Conditional Expressions (14), (15), and (16) is the biconvex positive lens L15. The lens having negative refractive power and disposed closest to the image side is the biconcave negative lens L38.

TABLE 18

[Values compliant to conditional expressions]

fL1 = 803.220
fL2 = 591.433
f1A = 341.677
f1B = −2026.937
f3A = −174.503
f3B = 129.077
fr = −53.175
(1) D23/f1 = 0.690
(2) fL1/f1 = 5.293
(3) νL2 = 95.25
(4) νL3 = 95.25
(5) TL1/fL1 = 0.011
(6) TL2/fL2 = 0.020
(7) f/f1B = −0.192
(8) f1/f1B = −0.075
(9) f1A/f = 0.876
(10) f1A/f1 = 2.251
(11) f1A/f1B = −0.169
(12) θgFn − 0.6558 + 0.01982 × νdn = −0.0047
(13) νdn = 37.64
(14) νdp = 27.35
(15) ndp + 0.01452 × νdp = 2.0536
(16) θgFp + 0.00316 × νdp = 0.71830
(17) f2/f = −0.173
(18) f3/f3A = −1.756
(19) f3/f3B = 2.374
(20) TL/f = 1.039
(21) (−fr)/f = 0.136

As described above, the optical system OL6 satisfies Conditional Expressions (1) to (21) described above.

FIG. 12 shows a spherical aberration diagram, an astigmatism diagram, a distortion diagram, a lateral chromatic aberration diagram, and a coma aberration diagram of the optical system OL6 at focusing upon an infinite distance object and at focusing upon a close distance object. The aberration diagrams show that the optical system OL6 allows favorable correction of the variety of aberrations and provides excellent imaging performance.

Seventh Example

FIG. 13 is a diagram showing the configuration of an optical system OL7 according to a seventh example. The optical system OL7 includes, sequentially from the object side, a front group G1 having positive refractive power, a focusing group G2 having negative refractive power, and a rear group G3 having positive refractive power. The front group G1 includes, sequentially from the object side, a front-group A group G1A and a front-group B group G1B between which the largest air space on the optical axis in the front group G1 is interposed. The focusing group G2 includes, sequentially from the object side, a focusing-group A group G2A and a focusing-group B group G2B. The rear group G3 includes, sequentially from the object side, a rear-group A group G3A and a rear-group B group G3B between which the largest air space on the optical axis in the rear group G3 is interposed.

The front-group A group G1A of the front group G1 includes, sequentially from the object side, a biconcave positive lens L11, and a positive meniscus lens L12 having a convex surface facing the object side.

The front-group B group G1B of the front group G1 includes, sequentially from the object side, a biconvex positive lens L13, a biconcave negative lens L14, a biconvex positive lens L15, and a cemented lens formed by cementing a biconcave negative lens L16 and a positive meniscus lens L17 having a convex surface facing the object side.

The focusing-group A group G2A is formed of a positive meniscus lens L21 having a convex surface facing the object side.

The focusing-group B group G2B is formed of a negative meniscus lens L22 having a convex surface facing the object side.

The rear-group A group G3A of the rear group G3 includes, sequentially from the object side, a biconcave negative lens L31, a cemented lens formed by cementing a positive meniscus lens L32 having a concave surface facing the object side and a biconcave negative lens L33, and a biconvex positive lens L34.

The rear-group B group G3B of the rear group G3 includes, sequentially from the object side, a biconvex positive lens L35, a cemented lens formed by cementing a negative meniscus lens L36 having a convex surface facing the object side and a biconvex positive lens L37, and a biconcave negative lens L38.

In addition, an aperture stop S is disposed between the focusing group G2 and the rear group G3. In addition, a filter FL is disposed between the biconvex positive lens L35 and the cemented lens formed by cementing the negative meniscus lens L36 having a convex surface facing the object side and the biconvex positive lens L37.

The optical system OL7 is configured to move the focusing-group A group G2A included in the focusing group G2 to the object side and move the focusing-group B group G2B to the image side at focusing upon from an infinite distance object to a close distance object.

Moreover, the optical system OL7 is configured so that image position change due to vibration of the optical system OL7 is corrected by moving an anti-vibration group so as to have a displacement component in the direction perpendicular to the optical axis, the anti-vibration group including the biconcave negative lens L31 and the cemented lens formed by cementing the positive meniscus lens L32 having a concave surface facing the object side and the biconcave negative lens L33 in the rear-group A group G3A of the rear group G3.

Table 19 below shows values of specifications of the optical system OL7.

TABLE 19

Seventh example

[Overall specifications]

| | |
|---|---|
| f = | 390.0000 |
| FNO = | 2.9030 |
| 2ω = | 6.2959 |
| TL = | 405.3186 |
| BF = | 54.0003 |
| Y = | 21.60 |

[Lens data]

| m | r | d | nd | νd | θgF |
|---|---|---|---|---|---|
| Object plane | ∞ | | | | |
| 1 | 439.8093 | 8.2000 | 1.518600 | 69.89 | |
| 2 | −1741.2521 | 0.1000 | | | |
| 3 | 222.5379 | 12.0000 | 1.433852 | 95.25 | |
| 4 | 1393.9654 | 97.1809 | | | |
| 5 | 139.4073 | 11.0000 | 1.433852 | 95.25 | |
| 6 | −380.4635 | 0.1050 | | | |
| 7 | −416.7878 | 3.0000 | 1.683760 | 37.64 | 0.5782 |
| 8 | 192.2903 | 59.0562 | | | |
| 9 | 102.4273 | 6.6000 | 1.663820 | 27.35 | 0.6319 |
| 10 | −401.4769 | 0.1362 | | | |
| 11 | −360.0793 | 1.8000 | 1.737999 | 32.26 | 0.5899 |
| 12 | 58.7393 | 8.8000 | 1.497820 | 82.57 | |
| 13 | 1167.4655 | D1 | | | |
| 14 | 83.8395 | 6.2000 | 1.497820 | 82.57 | |
| 15 | 10090.0640 | D2 | | | |
| 16 | 690.6259 | 1.8000 | 1.755000 | 52.33 | |
| 17 | 60.0805 | D3 | | | |
| 18 | 0.0000 | 7.0861 | | | Aperture stop S |
| 19 | −246.8276 | 1.8000 | 1.910822 | 35.25 | |
| 20 | 116.7166 | 3.8112 | | | |
| 21 | −73.3878 | 4.1000 | 1.846663 | 23.78 | |
| 22 | −39.7299 | 1.8000 | 1.497820 | 82.57 | |
| 23 | 433.0885 | 4.6000 | | | |
| 24 | 89.2307 | 3.8000 | 1.612660 | 44.46 | |
| 25 | −1734.6597 | 40.2586 | | | |
| 26 | 55.6338 | 5.5000 | 1.696800 | 55.52 | |
| 27 | −779.8112 | 10.0000 | | | |
| 28 | 0.0000 | 1.5000 | 1.516800 | 63.88 | |
| 29 | 0.0000 | 0.1000 | | | |
| 30 | 63.5589 | 1.5000 | 1.804000 | 46.60 | |
| 31 | 26.0339 | 8.8000 | 1.612660 | 44.46 | |
| 32 | −212.3772 | 4.7866 | | | |
| 33 | −69.8293 | 1.5000 | 2.000694 | 25.46 | |
| 34 | 198.2621 | D4 | | | |
| Image plane | ∞ | | | | |

[Focal length of lens groups]

| Lens group | First surface | Focal length |
|---|---|---|
| Front group | 1 | 282.014 |
| Focusing-group A group | 14 | 169.789 |
| Focusing-group B group | 16 | −87.266 |
| Rear group | 19 | 310.889 |

In the optical system OL7, an on-axis air space D1 between the front group G1 and the focusing-group A group G2A, an on-axis air space D2 between the focusing-group A group G2A and the focusing-group B group G2B, an on-axis air space D3 between the focusing-group B group G2B and the rear group G3, and an on-axis air space D4 (back focus) between the rear group G3 and the image plane change at focusing. Table 20 below shows variable distances at each of an infinite distance image capturing distance, an intermediate image capturing distance, and a close distance image capturing distance.

TABLE 20

| [Variable distance data] | | | |
|---|---|---|---|
| Focusing state | Infinite distance | Intermediate distance | Close distance |
| f | 390.0000 | — | — |
| β | — | −0.0333 | −0.1682 |
| D1 | 16.0689 | 13.7323 | 23.5588 |
| D2 | 4.1000 | 8.0022 | 23.4588 |
| D3 | 14.2286 | 12.6630 | 6.5193 |
| D4 | 54.0003 | 54.0003 | 54.0003 |

Table 21 below shows values compliant to the conditional expressions in the optical system OL7. In the optical system OL7, the specific negative lens that satisfies Conditional Expressions (12) and (13) is the biconcave negative lens L14 and the biconcave negative lens L16, and the specific positive lens that satisfies Conditional Expressions (14), (15), and (16) is the biconvex positive lens L15. The lens having negative refractive power and disposed closest to the image side is the biconcave negative lens L38.

TABLE 21

| [Values compliant to conditional expressions] |
|---|
| fL1 = 677.928 |
| fL2 = 608.492 |
| f1A = 321.375 |
| f1B = 1086.517 |
| f3A = −150.173 |
| f3B = 121.083 |
| fr = −51.461 |
| (1) D23/f1 = 0.690 |
| (2) fL1/f1 = 2.404 |
| (3) vL2 = 95.25 |
| (4) vL3 = 95.25 |
| (5) TL1/fL1 = 0.012 |
| (6) TL2/fL2 = 0.020 |
| (7) f/f1B = 0.359 |
| (8) f1/f1B = 0.260 |
| (9) f1A/f = 0.824 |
| (10) f1A/f1 = 1.140 |
| (11) f1A/f1B = 0.296 |
| (12) θgFn − 0.6558 + 0.01982 × vdn = −0.0047 |
| (13) vdn = 37.64 |
| (14) vdp = 27.35 |
| (15) ndp + 0.01452 × vdp = 2.0536 |
| (16) θgFp + 0.00316 × vdp = 0.71830 |
| (17) f2/f = −0.520 |
| (18) f3/f3A = 0.581 |
| (19) f3/f3B = −0.721 |
| (20) TL/f = 1.039 |
| (21) (−fr)/f = 0.132 |

As described above, the optical system OL7 satisfies Conditional Expressions (1) to (21) described above.

FIG. 14 shows a spherical aberration diagram, an astigmatism diagram, a distortion diagram, a lateral chromatic aberration diagram, and a coma aberration diagram of the optical system OL7 at focusing upon an infinite distance object and at focusing upon a close distance object. The aberration diagrams show that the optical system OL7 allows favorable correction of the variety of aberrations and provides excellent imaging performance.

REFERENCE SIGNS LIST

1 Camera (optical apparatus)
OL (OL1 to OL7) Optical system
G1 Front group
G1A Front-group A group
G1B Front-group B group
G2 Focusing group
G3 Rear group
G3A Rear-group A group
G3B Rear-group B group
S Aperture stop

The invention claimed is:

1. An optical system comprising, sequentially from an object side:
a front group having positive refractive power; and
a focusing group that performs focusing by moving in an optical axis direction, wherein
the front group includes, sequentially from the object side, a front-group A lens group and a front-group B lens group between which a largest air space on the optical axis in the front group is interposed,
the front-group A lens group consists of, sequentially from the object side:
a first lens, and
a second lens,
the front-group B lens group includes:
a third lens,
the first lens has positive refractive power,
the second lens has positive refractive power,
the first lens, the second lens, and the third lens being disposed sequentially in this order from the object side, and
the following conditional expressions are satisfied:

$0.10 < D23/f1 < 0.65$ $-0.50 < f1/f1B < 0.00$ when $f1B < 0.00$ $0.00 < f1/f1B < 3.00$ when $f1B > 0.00$ where
f1: focal length of the front group,
D23: distance on an optical axis between the second lens and the third lens, and
f1B: focal length of the front-group B lens group.

2. The optical system according to claim 1, wherein the following conditional expression is satisfied:

$1.00 < fL1/f1 < 6.00$ where
fL1: focal length of the first lens.

3. The optical system according to claim 1, wherein the following conditional expression is satisfied:

$75.00 < vL2 < 100.00$ where
vL2: Abbe number of a medium of the second lens at a d line.

4. The optical system according to claim 1, wherein the following conditional expression is satisfied:

$75.00 < vL3 < 100.00$ where
vL3: Abbe number of a medium of the third lens at a d line.

5. The optical system according to claim 1, wherein the following conditional expression is satisfied:

$0.001 < TL1/fL1 < 0.025$ where
fL1: focal length of the first lens, and
TL1: thickness of the first lens on the optical axis.

6. The optical system according to claim 1, wherein the following conditional expression is satisfied:

$$0.010 < TL2/fL2 < 0.035$$

where
fL2: focal length of the second lens, and
TL2: thickness of the second lens on the optical axis.

7. The optical system according to claim 1, wherein the following conditional expression is satisfied:

$$-1.00 < f/f1B < 0.00 \text{ when } f1B < 0.00$$

$$0.00 < f/f1B < 5.00 \text{ when } f1B > 0.00$$

where
f: overall focal length of the optical system in a state of focusing at infinity.

8. The optical system according to claim 1, wherein the following conditional expression is satisfied:

$$0.50 < f1A/f < 1.50$$

where
f: overall focal length of the optical system in a state of focusing at infinity, and
f1A: focal length of the front-group A lens group.

9. The optical system according to claim 1, wherein the following conditional expression is satisfied:

$$0.50 < f1A/f1 < 2.50$$

where
f1A: focal length of the front-group A lens group.

10. The optical system according to claim 1, wherein the following conditional expression is satisfied:

$$-0.50 < f1A/f1B < 0.00 \text{ when } f1B < 0.00$$

$$0.00 < f1A/f1B < 3.00 \text{ when } f1B > 0.00$$

where
f1A: focal length of the front-group A lens group.

11. The optical system according to claim 1, wherein the front group includes at least one negative lens that satisfies the following conditional expressions:

$$-0.015 < \theta gFn - 0.6558 + 0.001982 \times vdn < 0.000$$

$$vdn < 50.00$$

where
θgFn: partial dispersion ratio of a medium of the negative lens, and
vdn: Abbe number of the medium of the negative lens at a d line.

12. The optical system according to claim 1, wherein the front group includes at least one positive lens that satisfies the following conditional expressions:

$$20.00 < vdp < 30.00$$

$$1.830 < ndp + 0.01425 \times vdp < 2.120$$

$$0.7020 < \theta gFp + 0.00316 \times vdp$$

where
vdp: Abbe number of a medium of the positive lens at a d line,
ndp: refractive index of the medium of the positive lens at the d line, and
θgFp: partial dispersion ratio of the medium of the positive lens.

13. The optical system according to claim 1, wherein the following conditional expression is satisfied:

$$-0.60 < f2/f < 0.00 \text{ when } f2 < 0.00$$

$$0.00 < f2/f < 0.60 \text{ when } f2 > 0.00$$

where
f: overall focal length of the optical system in a state of focusing at infinity, and
f2: focal length of the focusing group.

14. The optical system according to claim 1, further comprising a rear group on an image side of the focusing group.

15. The optical system according to claim 1, further comprising an aperture stop on an image side of the focusing group.

16. The optical system according to claim 1, further comprising a rear group on an image side of the focusing group,
wherein at least part of the rear group is movable so as to have a displacement component in a direction perpendicular to the optical axis.

17. The optical system according to claim 1, further comprising a rear group on an image side of the focusing group,
wherein the rear group includes, sequentially from the object side, a rear-group A lens group and a rear-group B lens group between which a largest air space on the optical axis in the rear group is interposed.

18. The optical system according to claim 1, further comprising a rear group on an image side of the focusing group, wherein
the rear group includes, sequentially from the object side, a rear-group A lens group and a rear-group B lens group between which a largest air space on the optical axis in the rear group is interposed, and
the following conditional expression is satisfied:

$$-4.00 < f3/f3A < 0.00 \text{ when } f3A < 0.00$$

$$0.00 < f3/f3A < 7.00 \text{ when } f3A > 0.00$$

where
f3: focal length of the rear group, and
f3A: focal length of the rear-group A lens group.

19. The optical system according to claim 1, further comprising a rear group on an image side of the focusing group, wherein
the rear group includes, sequentially from the object side, a rear-group A lens group and a rear-group B lens group between which a largest air space on the optical axis in the rear group is interposed, and
the following conditional expression is satisfied:

$$-3.00 < f3/f3B < 0.00 \text{ when } f3B < 0.00$$

$$0.00 < f3/f3B < 5.00 \text{ when } f3B > 0.00$$

where
f3: focal length of the rear group, and
f3B: focal length of the rear-group B lens group.

20. The optical system according to claim 1, wherein the following conditional expression is satisfied:

$$0.70 < TL/f < 1.10$$

where
f: overall focal length of the optical system in a state of focusing at infinity, and
TL: total length of the optical system in a state of focusing at infinity.

21. The optical system according to claim 1, wherein the following conditional expression is satisfied:

$0.02 < (-fr)/f < 0.35$ where
f: overall focal length of the optical system in a state of focusing at infinity, and
fr: focal length of a lens having negative refractive power and disposed closest to an image side.

22. An optical apparatus comprising the optical system according to claim 1.

23. A method for manufacturing an optical system including, sequentially from an object side, a front group having positive refractive power and a focusing group that performs focusing by moving in an optical axis direction, the method for manufacturing the optical system comprising:

disposing in the front group, sequentially from the object side, a front-group A lens group and a front-group B lens group, between which a largest air space on the optical axis in the front group is interposed, disposing, sequentially from the object side, a first lens, and a second lens in the front-group A lens group, and a third lens in the front-group B lens group, wherein the front-group A lens group consists of the first lens and the second lens, the first lens, the second lens, and the third lens being disposed sequentially in this order from the object side, the first lens having positive refractive power, and the second lens having positive refractive power; and disposing the lenses so that the following conditional expressions are satisfied:

$0.10 < D23/f1 < 0.65$ $-0.50 < f1/f1B < 0.00$ when $f1B < 0.00$ $0.00 < f1/f1B < 3.00$ when $f1B > 0.00$ where
f1: focal length of the front group,
D23: distance on the optical axis between the second lens and the third lens, and
f1B: focal length of the front-group B lens group.

* * * * *